(12) United States Patent
Trui et al.

(10) Patent No.: US 11,904,465 B2
(45) Date of Patent: Feb. 20, 2024

(54) SPHERICAL COORDINATE ORIENTATING MECHANISM

(71) Applicant: Wen-Der Trui, Taichung (TW)

(72) Inventors: Wen-Der Trui, Taichung (TW); Shu-Ching Lin, Taichung (TW)

(73) Assignee: Wen-Der Trui, Taichung (TW)

( * ) Notice: Subject to any disclaimer, the term of this patent is extended or adjusted under 35 U.S.C. 154(b) by 39 days.

(21) Appl. No.: 17/517,965

(22) Filed: Nov. 3, 2021

(65) Prior Publication Data

US 2022/0134538 A1 May 5, 2022

(30) Foreign Application Priority Data

Nov. 3, 2020 (TW) ................................ 109138311

(51) Int. Cl.
*B25J 9/04* (2006.01)
*B25J 9/10* (2006.01)
*B25J 13/08* (2006.01)
*B25J 9/00* (2006.01)

(52) U.S. Cl.
CPC .............. *B25J 9/045* (2013.01); *B25J 9/0048* (2013.01); *B25J 9/102* (2013.01); *B25J 9/104* (2013.01); *B25J 9/108* (2013.01); *B25J 13/088* (2013.01)

(58) Field of Classification Search
CPC . B25J 9/045; B25J 9/0048; B25J 9/102; B25J 9/104; B25J 9/108; B25J 13/088
USPC .......................... 434/59; 472/59, 130; 901/18
See application file for complete search history.

(56) References Cited

U.S. PATENT DOCUMENTS

| 5,342,244 | A | * | 8/1994 | Nelson | A63B 19/04 472/17 |
| 6,026,703 | A | * | 2/2000 | Stanisic | B25J 17/0266 464/106 |
| 7,735,385 | B2 | * | 6/2010 | Wilson | B25J 9/102 74/89.18 |
| 8,579,714 | B2 | * | 11/2013 | Trui | F16M 11/18 472/59 |
| 9,579,786 | B2 | * | 2/2017 | Trui | F16M 11/18 |
| 9,851,045 | B2 | * | 12/2017 | Trui | G01B 5/004 |
| 2010/0043577 | A1 | * | 2/2010 | Rosheim | F16M 11/123 74/5.4 |

(Continued)

FOREIGN PATENT DOCUMENTS

KR 20180083246 A * 7/2018 .......... B25J 19/0008

*Primary Examiner* — Bobby Rushing, Jr.
(74) *Attorney, Agent, or Firm* — Maier & Maier, PLLC

(57) ABSTRACT

A mechanism is constructed by twelve-axis geometry and controlled by spherical coordinate, so that all torques in twelve axes can be parallelly integrated. Timing belts, pulleys, hollow shafts, and spur gears onto four arc-link sets are included. Via these transmission components, base arc-links can be indirectly but synchronously rotated by base driving modules and terminal arc-links can be indirectly but synchronously rotated by terminal driving modules. The final output torque can be integrated via serial linking and parallel cooperating by the twelve rotating modules. Therefore, four arc-link sets work cooperatively and effectively in group but bear no burden each other. The mechanism can be applied to a multi-axis composite machining center machine or a multi-time element detection measuring bed and shoulder joints or hip joints corresponding to robots.

13 Claims, 32 Drawing Sheets

(56) References Cited

U.S. PATENT DOCUMENTS

2011/0207106 A1\* 8/2011 Pacheco ................ G09B 23/10
434/300

\* cited by examiner

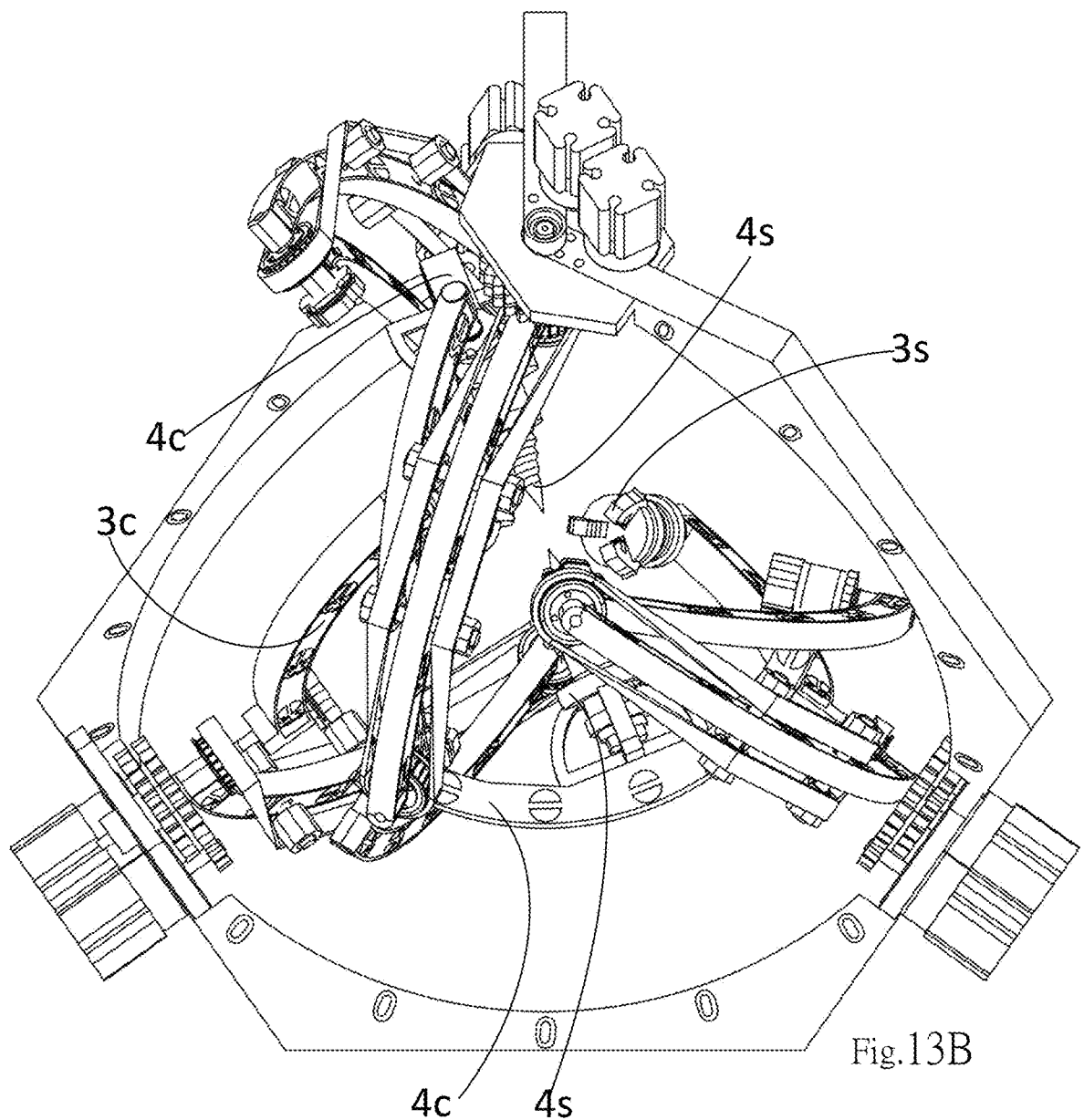

US 11,904,465 B2

SPHERICAL COORDINATE ORIENTATING MECHANISM

FIELD

A mechanism geometrically constituted with twelve axes can be manipulated for spherical coordinate kinematics. The invention can be applied to a multi-axis composite machining center machine or a multi-time element detection measuring shoulder joints of robots or hip joints of robots.

BACKGROUND

The embodiments may be directed to a geometric configuration shown in three related patents: a first patent (U.S. Pat. No. 8,579,714), a second patent (U.S. Pat. No. 9,579,786, EP2863102, CN104511904), and a third patent (U.S. Pat. No. 9,851,045, EP3196532, CN107030682).

An important issue is how to make a twelve axes mechanism operate smoothly without mutual interference and/or singularity while contemplating practical design and regulating geometric limitation. Therefore, the invention is directed to a new approach regarding to interference and singularity avoidance compared to the first patent (U.S. Pat. No. 8,579,714). One of the two geometric tetrahedron frames may be decoupled and reconstructed as two separated terminal frames which are constituted by two individual geometric arcs. The other geometric tetrahedron frame may not change its original geometric definition.

Compared with the third patent (U.S. Pat. No. 9,851,045) listed above, the following new features are emphasized: adding timing belts, pulleys, hollow shafts, and spur gears onto four arc-link sets. Via these transmission components, base arc-links can be indirectly but synchronously rotated by base driving modules and terminal arc-links can be indirectly but synchronously rotated by terminal driving modules. The final output torque can be integrated via serial linking and parallel cooperating by the twelve rotating modules. Therefore, four arc-link sets work cooperatively and effectively in a group but bear no burden on each other. New figures are shown as FIG. 3C, FIG. 4C, FIG. 5C, and FIG. 6C.

The above and other objects, features, and advantages will become apparent from the following detailed description taken with the accompanying drawings.

SUMMARY

It is one objective of the present disclosure to provide a mechanism geometrically constituted with twelve axes configured to be manipulated for spherical coordinate kinematics.

A twelve-axis mechanism includes a base frame, two terminal frame sets, four arc-link sets, at least one base driver sets, at least one terminal driver sets, and at most two crank sets. the final output torque can be integrated via serial linking and parallel cooperating with the twelve rotating modules.

The "at most two" crank sets are meaningful. It should be emphasized that the quantity of the crank sets can be optional, that is zero, one, or two. For concisely categorizing, two independent claims are enumerated, i.e., claim 1 and claim 8. Claim 1 substantially includes a base frame set, two terminal frame sets, four arc-link sets, at least one base driver sets, at least one terminal driver sets, and at most two crank sets. Claim 8 substantially includes a base frame set, two terminal frame sets, four arc-link sets, at least one base driver sets, and at least one terminal driver sets. Except excluding crank sets, definitions and/or methods of all the other subsystems of claim 8 are same as those of claim 1.

There are six embodiments for sufficiently introducing the twelve-axis mechanism with a single crank set, with double crank sets, or without a crank set.

These and other objectives of the present disclosure will no doubt become obvious to those of ordinary skill in the art after reading the following detailed description that is illustrated in the various figures and drawings.

BRIEF DESCRIPTION OF THE DRAWINGS

FIG. 13B shows the third embodiment's 3-view drawings for the orbit specification I with double crank sets.

DETAILED DESCRIPTION OF THE EMBODIMENTS

In the embodiments, a mechanism may be manipulated for spherical coordinate kinematics and geometrically constituted by twelve axes. The mechanism comprises a base frame set, two terminal frame sets, four arc-link sets, at least one base driver sets, at least one terminal driver sets, and at most two crank sets.

The base frame set comprises a base frame $0c$ including a plurality of brackets and four base rotating modules $0a$ installed into the base frame $0c$. The base frame $0c$ is configured with four vertices which can be used to constitute a base geometrical tetrahedron. Each unit vector $U_i$, wherein i=1-4, respectively corresponds to a vertex-to-center line of the base geometrical tetrahedron and these four vertex-to-center lines converge at the center of the base frame $0c$. An angle between any two vertex-to-center lines of the base geometrical tetrahedron is geometrically represented as $\Lambda_{ij}=ArcCos(U_i \cdot U_j)$, wherein i≠j. The angle between any two vertex-to-center lines of the base geometrical tetrahedron is greater than 75° and less than 150°, i.e.: $75° < \Lambda_{ij} < 150°$. The geometric definition of the base frame set is shown in FIG. 1A, FIG. 2A, FIG. 3A, and FIG. 4A.

According to the first patent (U.S. Pat. No. 8,579,714), if the base frame $0c$ is geometrically defined as a regular tetrahedron, the regular tetrahedron frame may be easily designed and simulated due to its simple and symmetry. Thus, six angles defined by each pair of vertex-to-center lines of the base frame $0c$ are equal, approximately 109.5°, i.e.: $\Lambda_{12}=\Lambda_{13}=\Lambda_{14}=\Lambda_{23}=\Lambda_{24}=\Lambda_{34} \approx 109.5°$. But the regular tetrahedron is a configuration most likely to have singularities. This characteristic was clearly introduced and analyzed in the first patent (U.S. Pat. No. 8,579,714). For the sake of avoiding singularities, it is preferred that the base frame $0c$ is not defined as a regular tetrahedron.

Each base rotating module $0a$ comprises an outer hollow shaft $0a1$ and an inner hollow shaft $0a2$. Both ends of the outer hollow shaft $0a1$ are indicated as an active end and a passive end. Both ends of the inner hollow shaft $0a2$ are indicated as an active end and a passive end. The outer hollow shaft $0a1$ may pivotally rotate with the inner hollow shaft $0a2$.

Figure 1A:
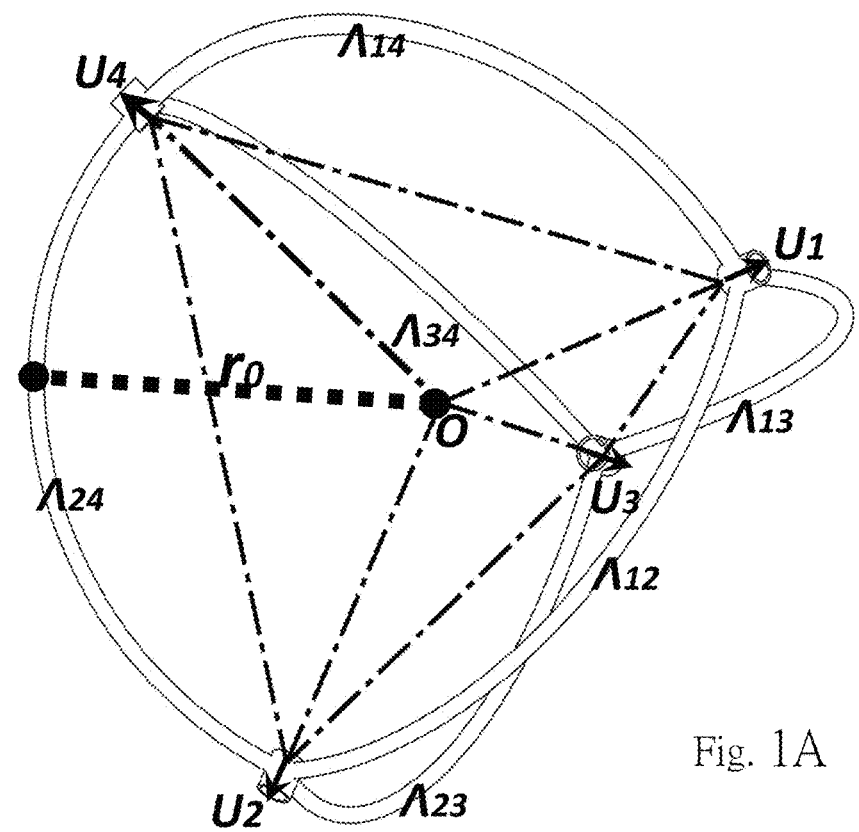
FIG. 1A shows geometrical and perspective drawings of base frame design type I.
Figure 1B:
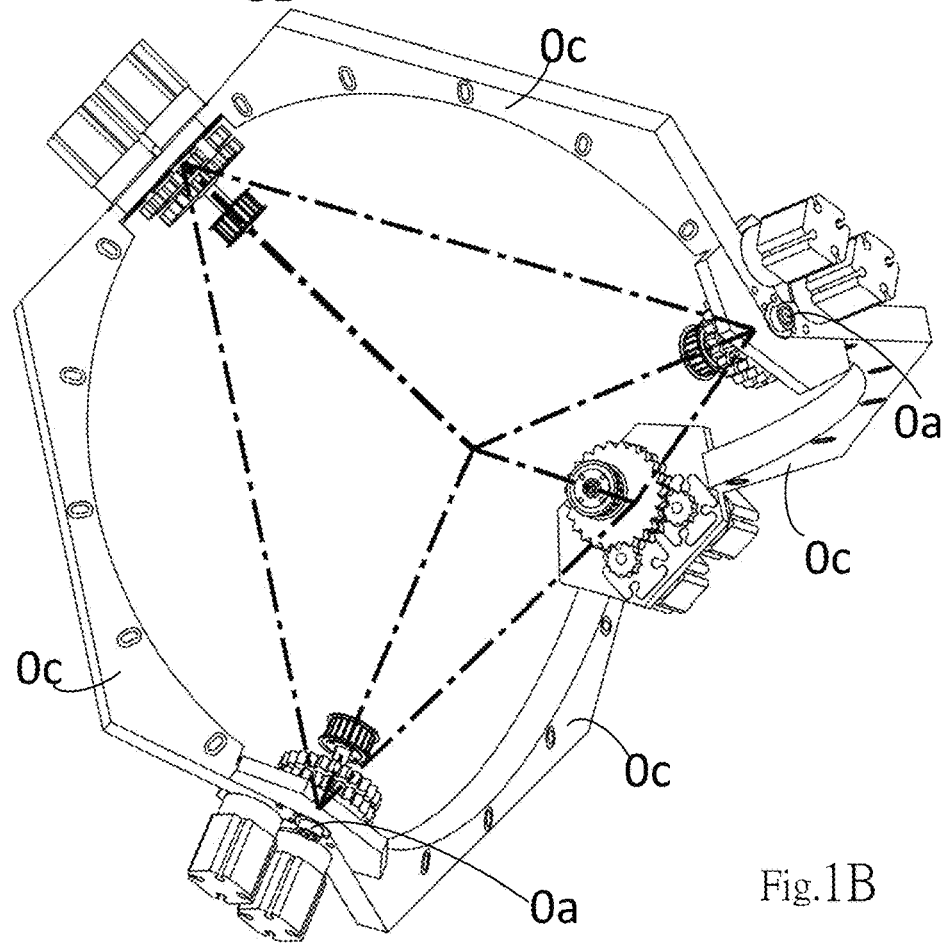
FIG. 1B shows geometrical and perspective drawings of base frame design type I.
Figure 2A:
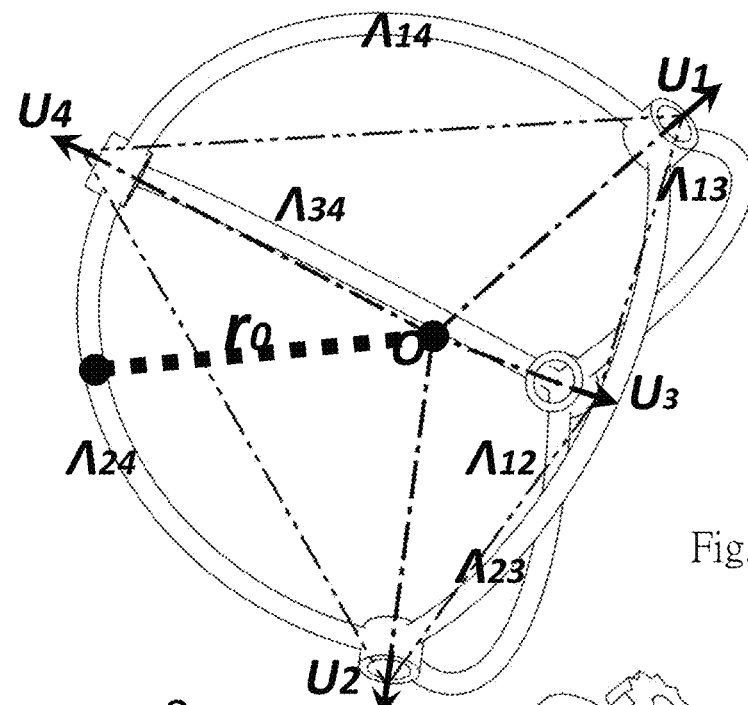
FIG. 2A shows geometrical and perspective drawings of base frame design type II.
Figure 2B:
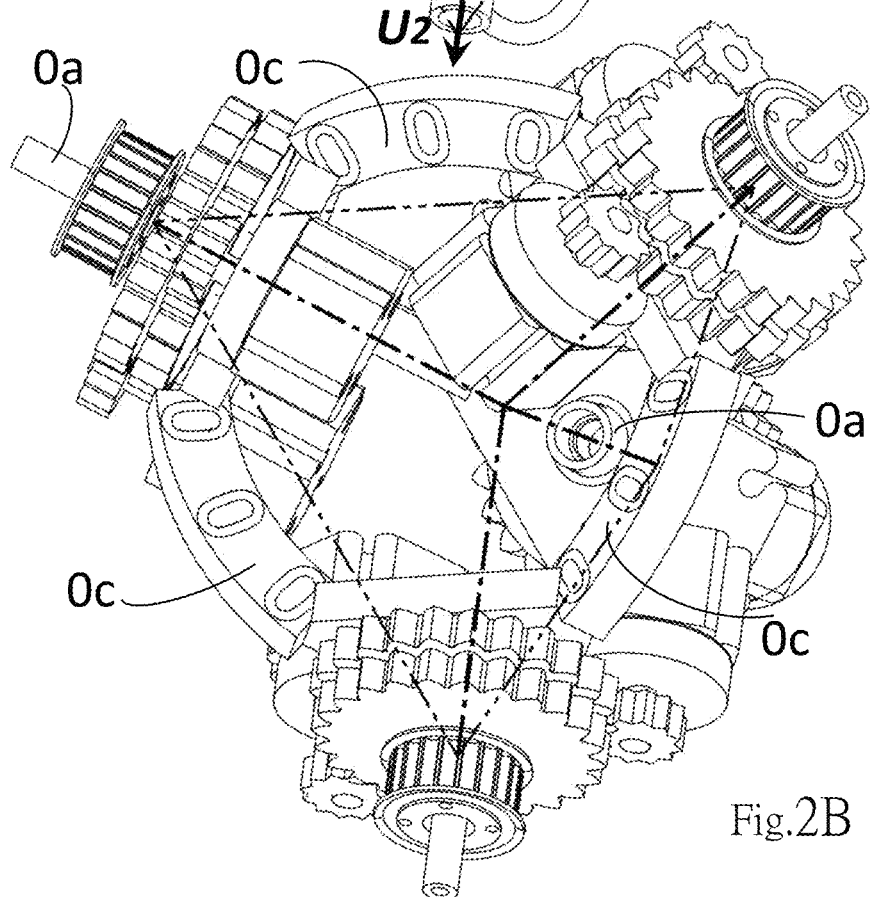
FIG. 2B shows geometrical and perspective drawings of base frame design type II.
Figure 7A:
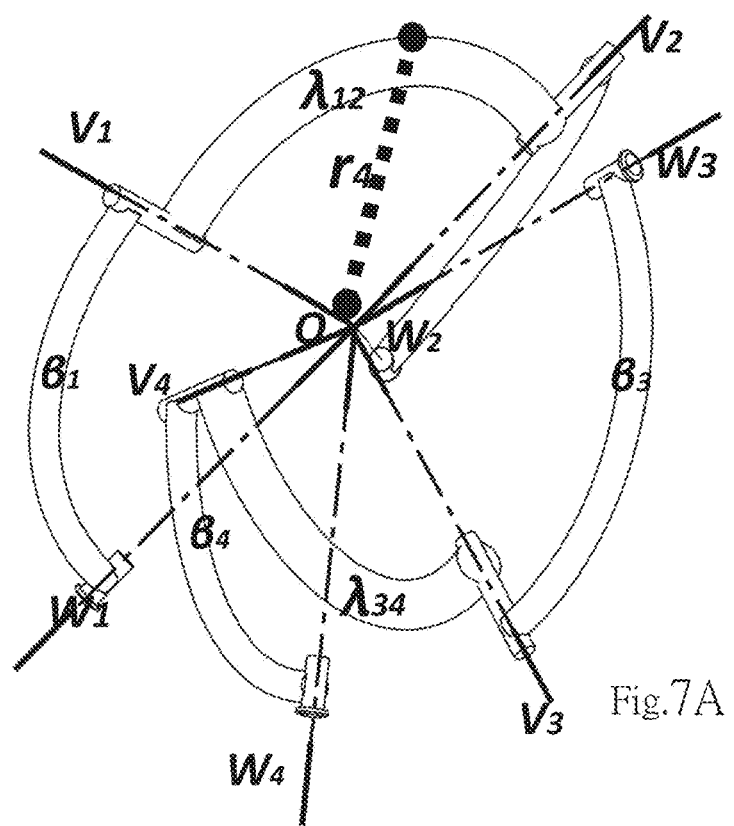
FIG. 7A shows geometrical and perspective drawings of the orbit specification I.
Figure 8A:
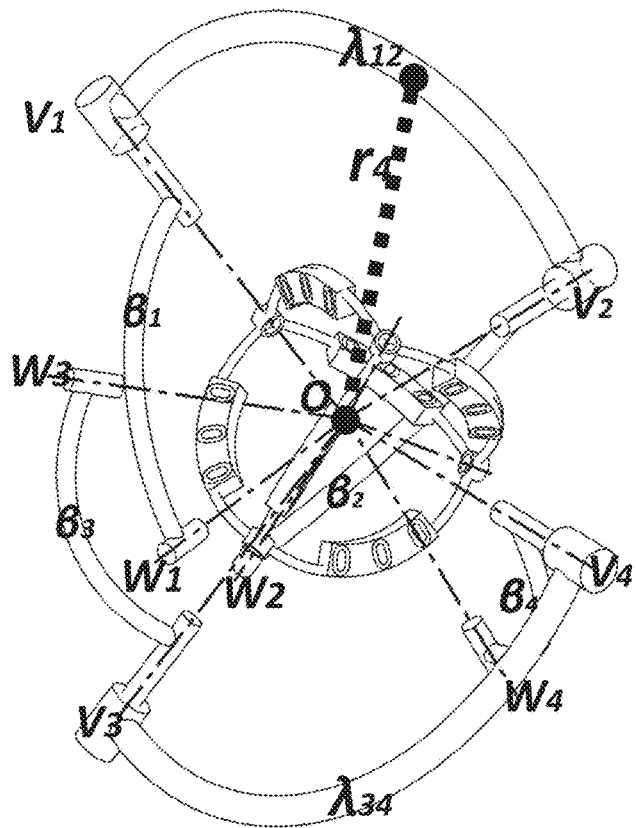
FIG. 8A shows geometrical and perspective drawings of the orbit specification II.

In the two terminal frame sets, each terminal frame set comprises a terminal frame $4c$ and two terminal rotating modules $4a$ installed into the terminal frame $4c$. The terminal frame $4c$ is geometrically defined by two vertices which can be used to constitute a terminal geometrical arc. Each axis of each terminal rotating module $4a$ respectively corresponds to a vertex-to-center line of the terminal geometrical arc and these vertex-to-center lines converge at the center of the base frame $0c$ for concentrically rotating the terminal frame along a specified geometric orbit. The radius of the base frame's geometric orbit is denoted by $r_0$, as shown in FIG. 1A and FIG. 2A. The radius of the terminal frame's geometric orbit is denoted by $r_4$, as shown in FIG. 7A and FIG. 8A.

The two vertex-to-center lines of the first terminal geometrical arc are individually denoted by unit vector $V_1$ and $V_2$. An angle between the two vertex-to-center lines is geometrically represented as $\lambda_{12}=ArcCos(V_1 \cdot V_2)$. The two vertex-to-center lines of the second terminal geometrical arc are individually denoted by unit vector $V_3$ and $V_4$. An angle between the two vertex-to-center lines is geometrically represented as $\lambda_{34}=ArcCos(V_3 \cdot V_4)$. The angle between the two vertex-to-center lines of the terminal geometrical arc is greater than 75° and less than 150°, i.e.: $75° < \lambda_{12} < 150°$ and $75° < \lambda_{34} < 150°$. The geometrical definitions of a terminal frame are shown in FIG. 5A, FIG. 6A, FIG. 7A, and FIG. 8A.

In the two terminal frame sets, each terminal frame set further comprises a terminal saddle $4s$ which can be equipped onto the terminal frame's opposite side relative to terminal arc-links $2c$ for carrying a payload. The terminal saddle $4s$ may function as a lifting mechanism having an extendable piston rod as implemented in pneumatic cylinders, hydraulic cylinders, or an electric actuator. Applications may include a robot's shoulder joint and a robot's hip joint.

In the four arc-link sets, each arc-link set comprises a base arc-link $1c$, a terminal arc-link $2c$, an arc-link rotating module $2a$, a base timing pulley $2p$, a terminal timing pulley $2q$, a timing belt $2b$, and at least one pair of idler pulleys $2z$. Both ends of the base arc-link $1c$ are indicated as a base end and a terminal end. Both ends of the terminal arc-link $2c$ are indicated as a base end and a terminal end.

The base end of the base arc-link $1c$ is pivotally rotated with the base end of the terminal arc-link $2c$ via the arc-link rotating module $2a$. The base end of the base arc-link $1c$ is pivotally fastened onto the passive end of the inner hollow shaft $0a2$ of the base rotating module $0a$. The terminal end of the terminal arc-link $2c$ is pivotally rotated with an axis of the terminal rotating module $4a$, each axis of arc-link rotating modules $2a$, denoted by unit vector $W_i$, wherein i=1-4, is normally directed into the center of the base frame $0c$ for concentrically rotating each arc-link set along specified geometric orbit between the base frame $0c$ and two terminal frames $4c$. The radius of each base arc-link's geometric orbit is denoted by $r_1$. The radius of each terminal arc-link's geometric orbit is denoted by $r_2$.

An arc-length of a base arc-link $1c$, geometrically represented by $\alpha_i=ArcCos(U_i \cdot W_i)$, is defined as an angle between two axes of the base rotating module $0a$ and the arc-link rotating module 2a which are individually connected with the same base arc-link 1c. An arc-length of a terminal arc-link 2c, geometrically represented by $\beta_i$=ArcCos $(V_i \cdot W_i)$, is defined as an angle between two axes of terminal rotating module 4a and the arc-link rotating module 2a which are individually connected with the same terminal arc-link 2c.

Referring to the first patent (U.S. Pat. No. 8,579,714), singularities avoidance and geometric limitation were clearly introduced and specifically analyzed. A sum of arc-lengths of any two of the base arc-links is greater than or equal to an angle between their corresponding vertex-to-center lines of the base geometrical tetrahedron, i.e.: $\Lambda_{ij} \leq \alpha_i + \alpha_j$, wherein i≠j. A sum of arc-lengths of any two of the terminal arc-links is greater than or equal to an angle between their corresponding vertex-to-center lines of the same terminal geometrical arc, i.e.: $\lambda_{12} \leq \beta_1 + \beta_2$ and $\lambda_{34} \leq \beta_3 + \beta_4$.

There may be a total of twelve axes in these four arc-link sets for pivoting with four base rotating modules 0a, four arc-link rotating modules 2a, and four terminal rotating modules 4a individually. Therefore, the final output torque can be integrated via serial linking and parallel cooperating with the twelve rotating modules.

The same twelve-axis geometric configuration as the three listed patents may be used. An important issue is how to make a twelve-axis mechanism operate smoothly without mutual interference and/or singularity while contemplating practical design and regulating geometric limitation. Therefore, the invention is directed to a new approach regarding to interference and singularity avoidance compared to the first patent (U.S. Pat. No. 8,579,714).

After synthesizing the definition just mentioned above, two orbit specifications are classified.

Figure 7B:
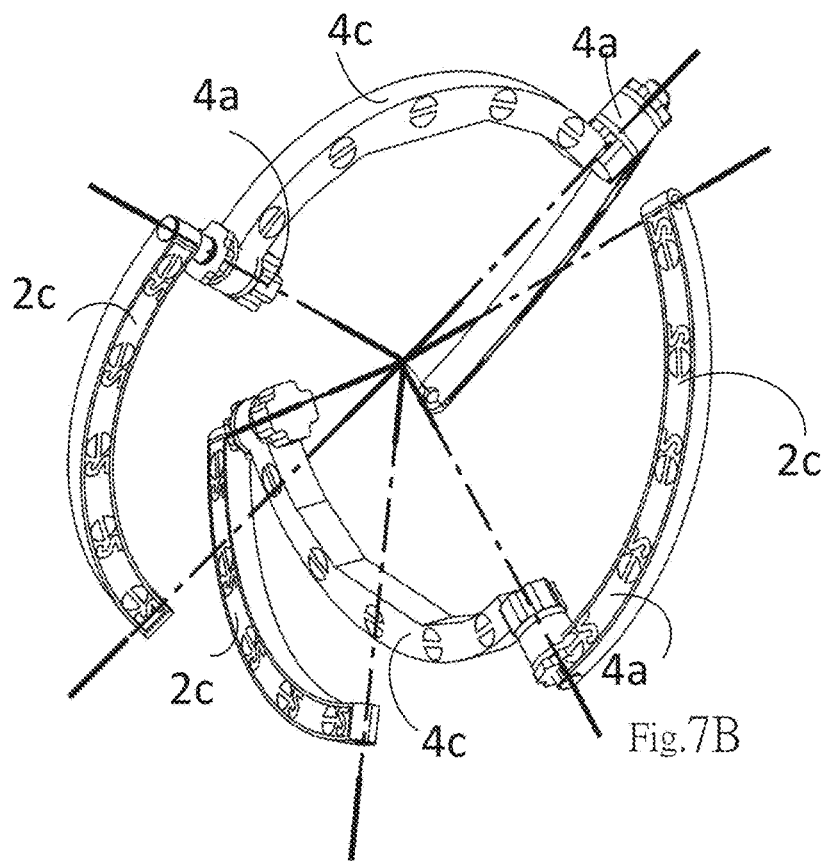
FIG. 7B shows geometrical and perspective drawings of the orbit specification I.

Orbit specification I: The radius of the base frame's geometric orbit is "greater than" the radius of the terminal frame's geometric orbit, and the radius of each base arc-link's geometric orbit is "greater than" the radius of each terminal arc-link's geometric orbit, i.e.: $r_0 > r_1 > r_2 > r_4$, shown as FIG. 7A-FIG. 7B.

Figure 8B:
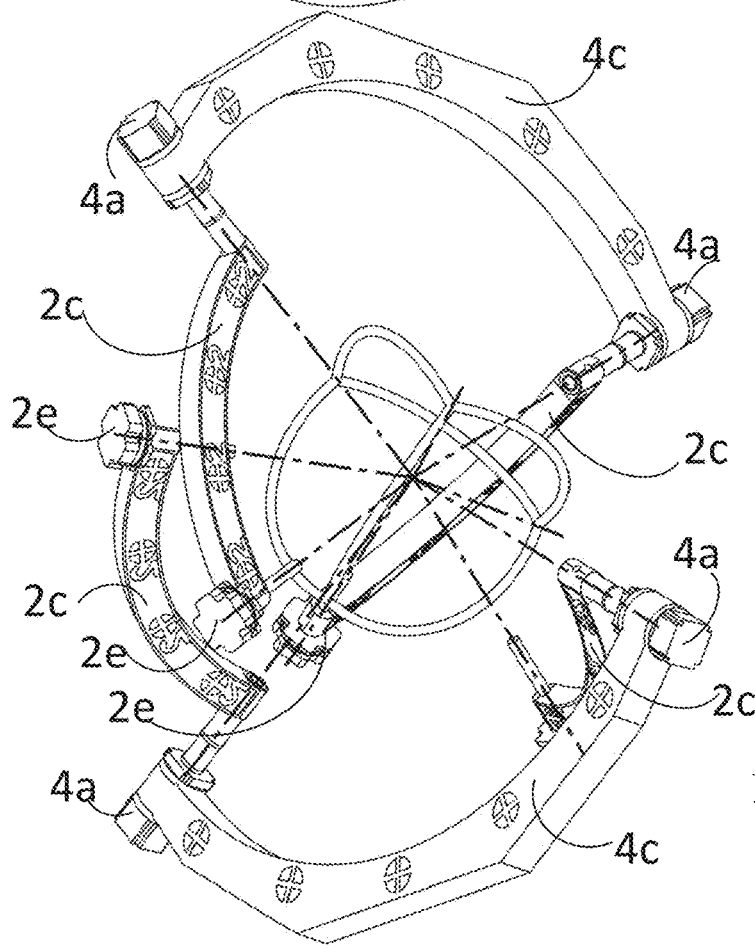
FIG. 8B shows geometrical and perspective drawings of the orbit specification.
Figure 9A:
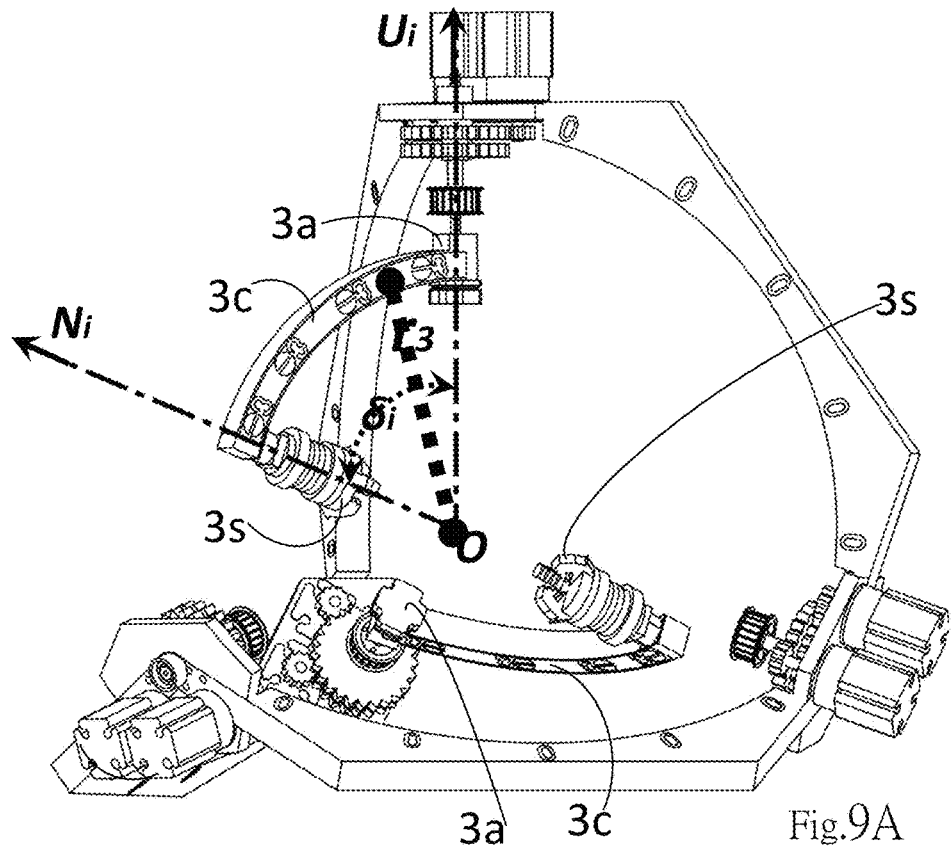
FIG. 9A shows geometrical and perspective drawings of a crank's pivotal configuration I.
Figure 9B:
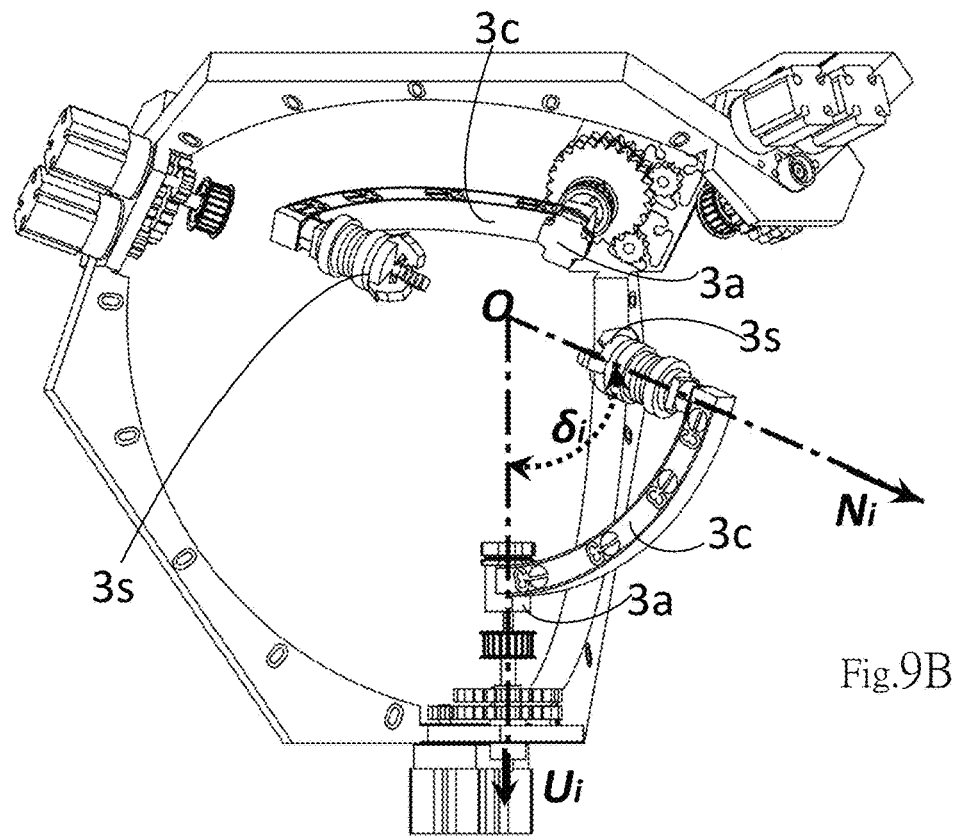
FIG. 9B shows geometrical and perspective drawings of a crank's pivotal configuration I.
Figure 10A:
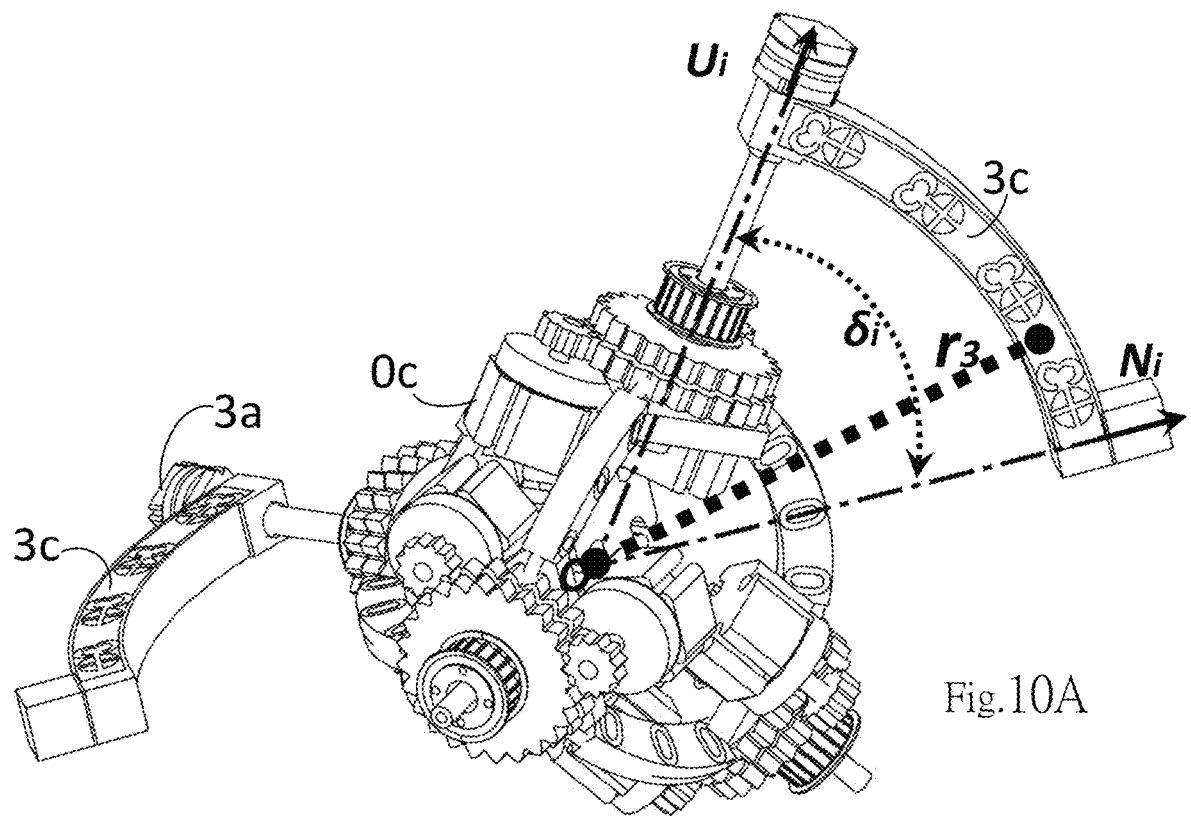
FIG. 10A shows geometrical and perspective drawings of a crank's pivotal configuration II.
Figure 10B:
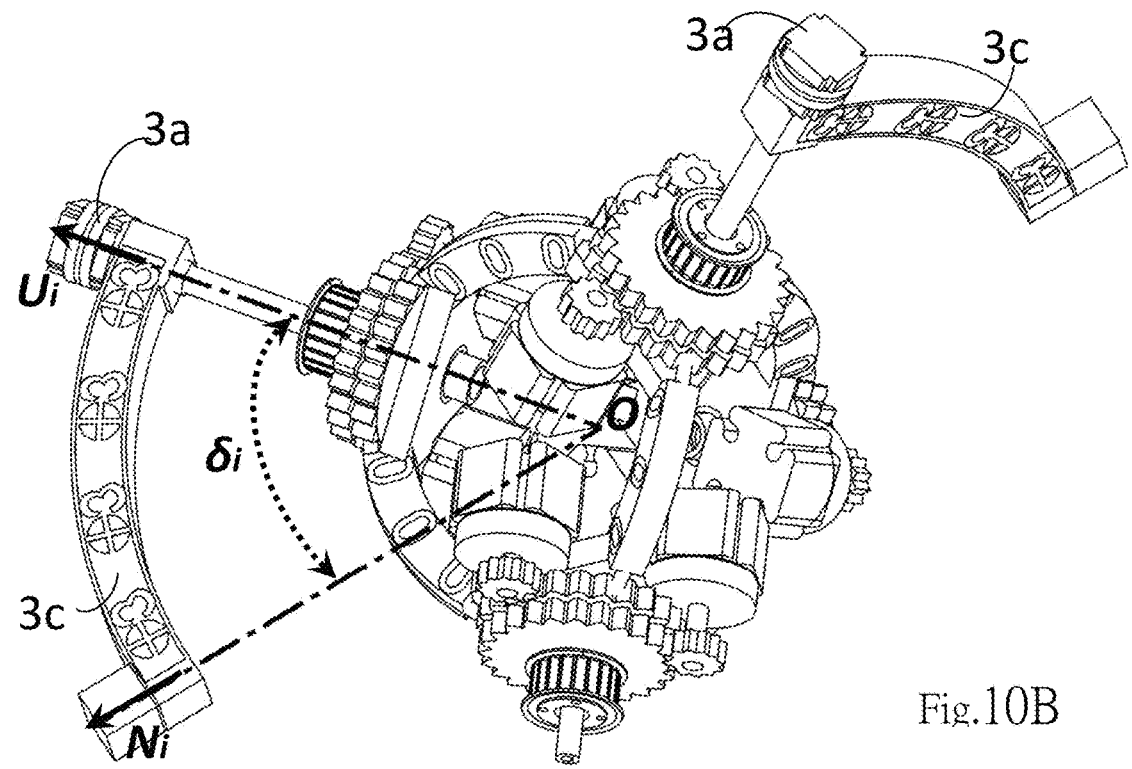
FIG. 10B shows geometrical and perspective drawings of a crank's pivotal configuration II.

Orbit specification II: The radius of the base frame's geometric orbit is "less than" the radius of the terminal frame's geometric orbit, and the radius of each base arc-link's geometric orbit is "less than" the radius of each terminal arc-link's geometric orbit, i.e.: $r_0 < r_1 < r_2 < r_4$, shown as FIG. 8A-FIG. 8B.

The base timing pulley 2p is pivotally fastened onto the active end of outer hollow shaft 0a1 of the base rotating module 0a. The terminal timing pulley 2q is pivotally fastened onto the base end of the terminal arc-link 2c. All flanges of the at least one pair of idler pulleys 2z are not able to exceed the outer flange of the base arc-link 1c. The at least one pair of idler pulleys 2z are installed onto both sides of the base arc-link 1c individually.

Figure 3A:
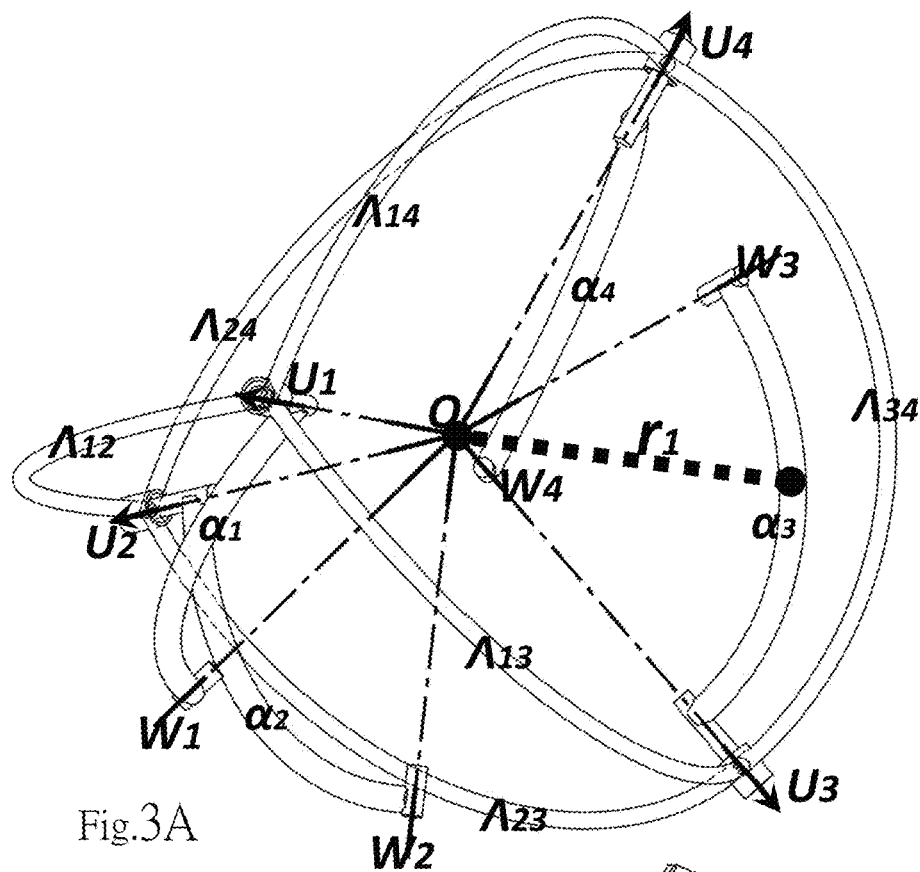
FIG. 3A shows geometrical and perspective drawings of base frame design type I.
Figure 3B:
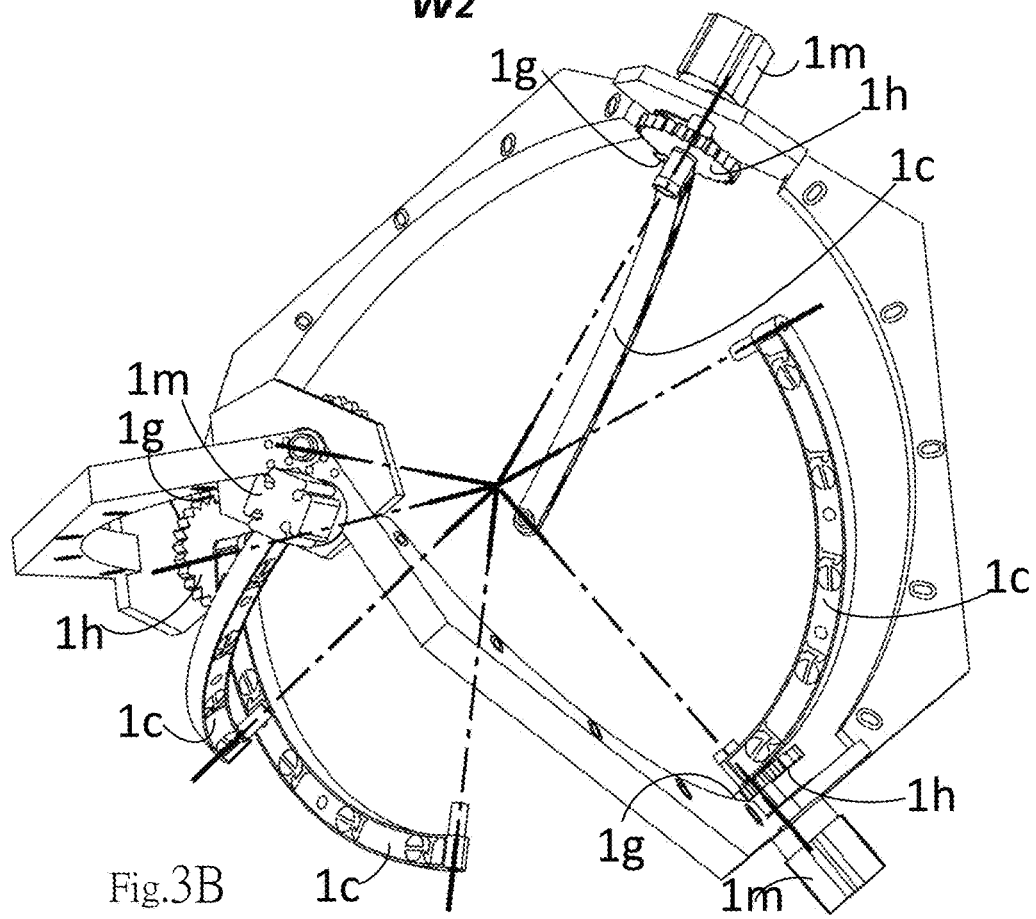
FIG. 3B shows geometrical and perspective drawings of base frame design type I.
Figure 3C:
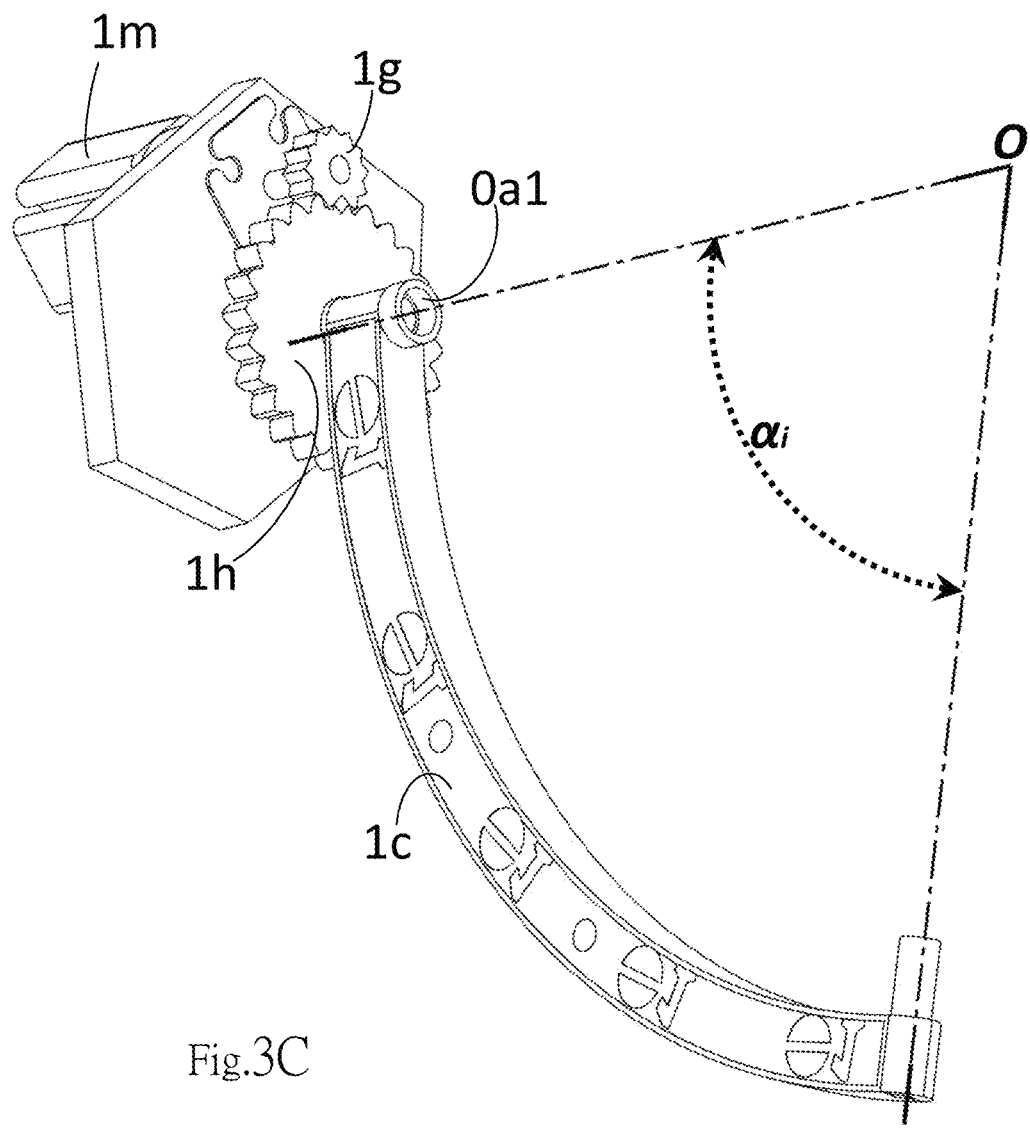
FIG. 3C shows geometrical and perspective drawings of base frame design type I.
Figure 4A:
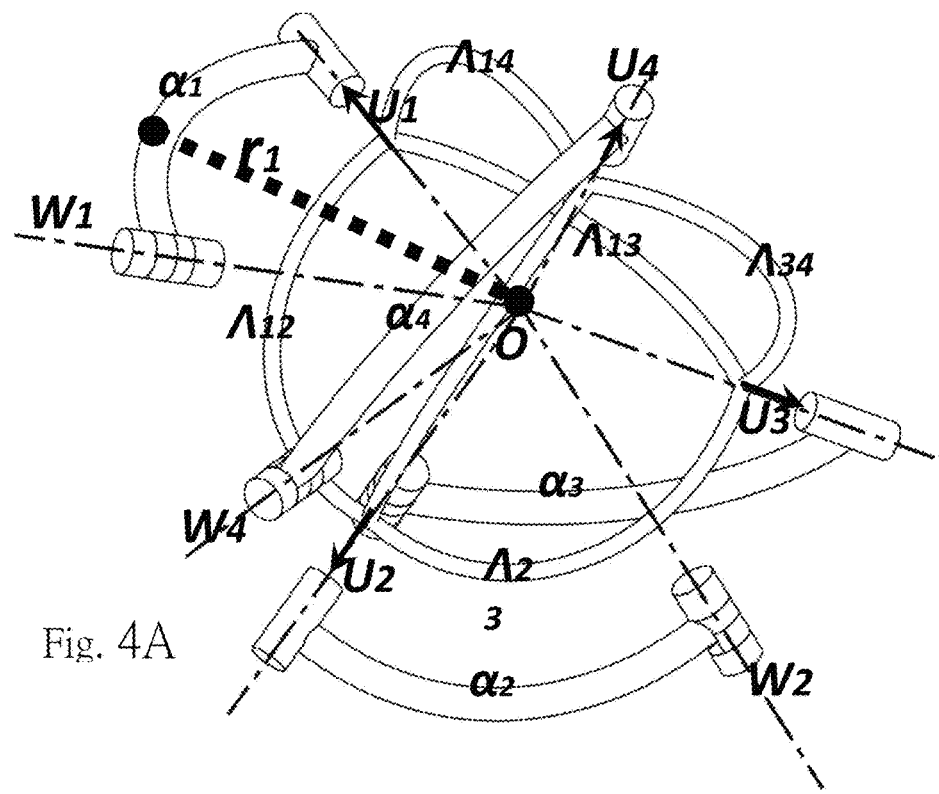
FIG. 4A shows geometrical and perspective drawings of base frame design type II.
Figure 4B:
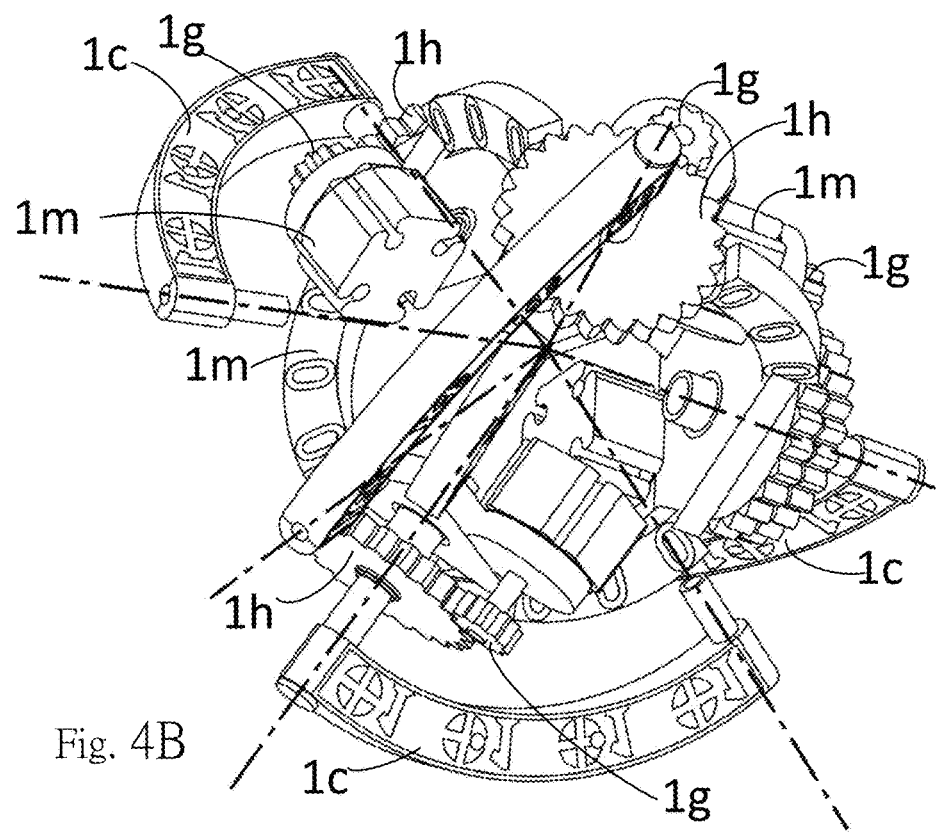
FIG. 4B shows geometrical and perspective drawings of base frame design type II.
Figure 4C:
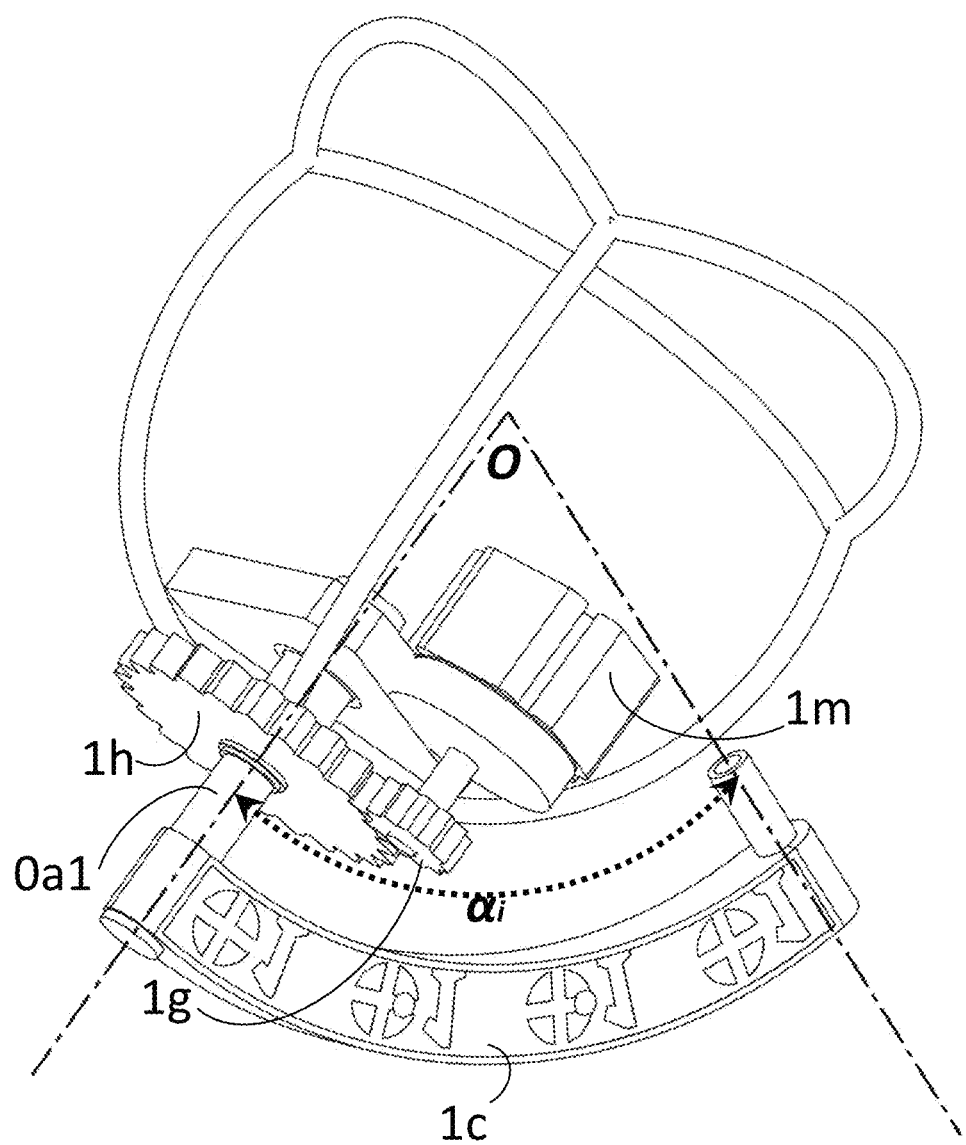
FIG. 4C shows geometrical and perspective drawings of base frame design type II.
Figure 6A:
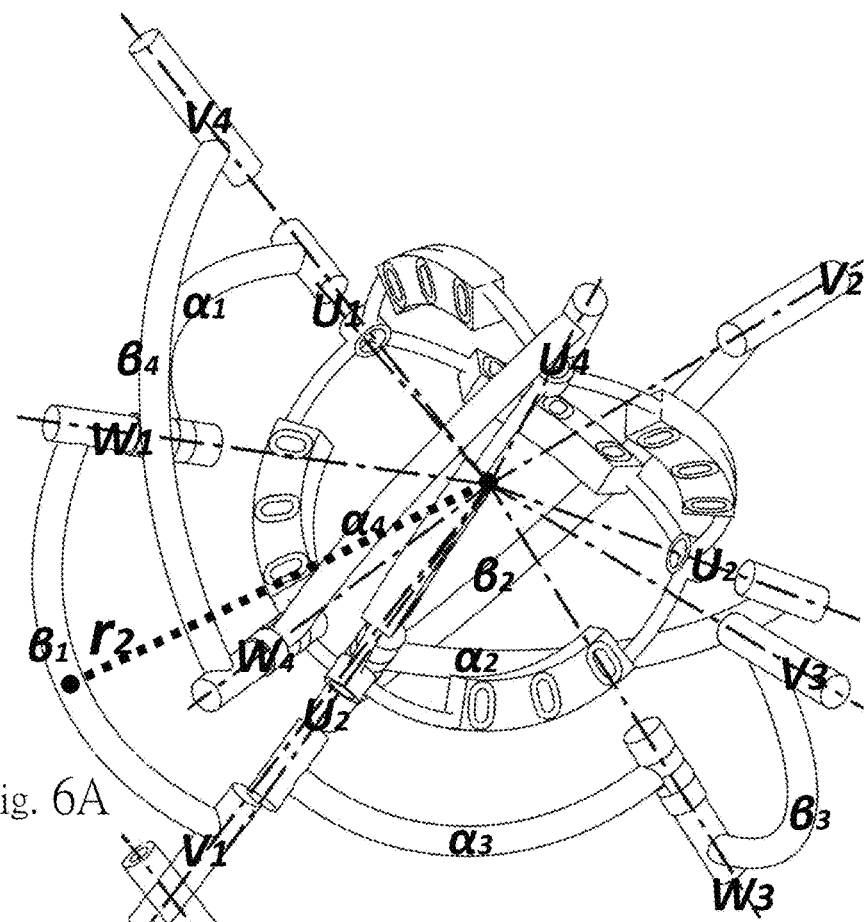
FIG. 6A shows geometrical and perspective drawings of the orbit specification II.
Figure 6B:
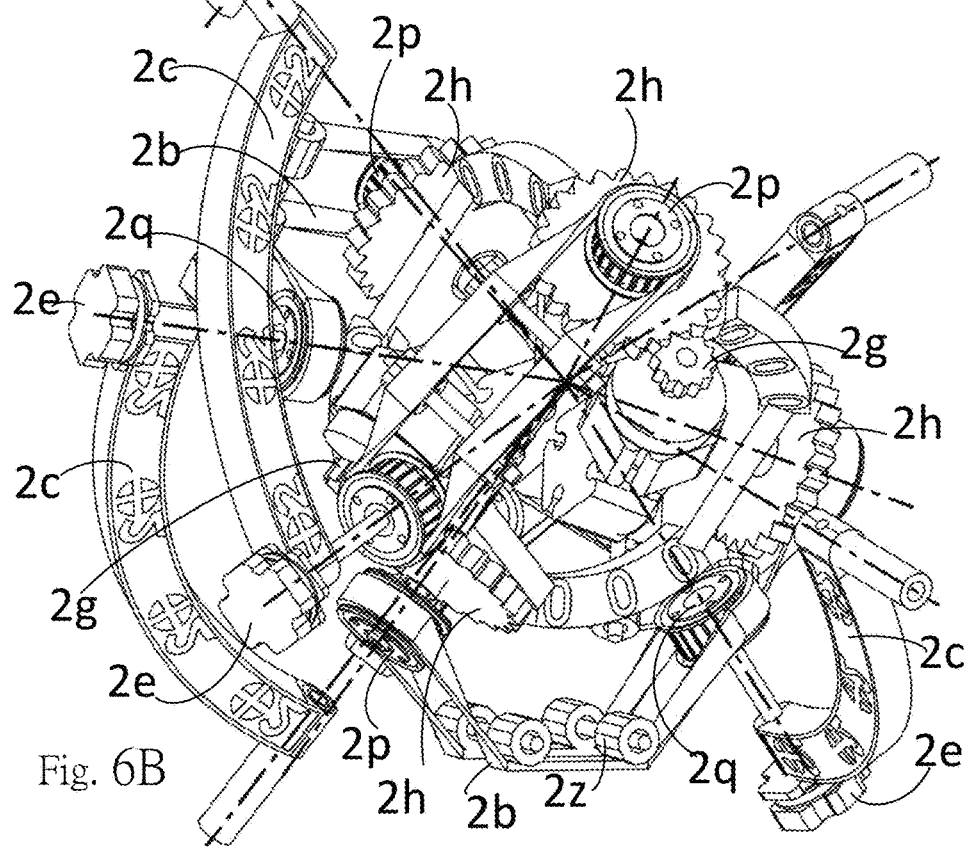
FIG. 6B shows geometrical and perspective drawings of the orbit specification II.
Figure 6C:
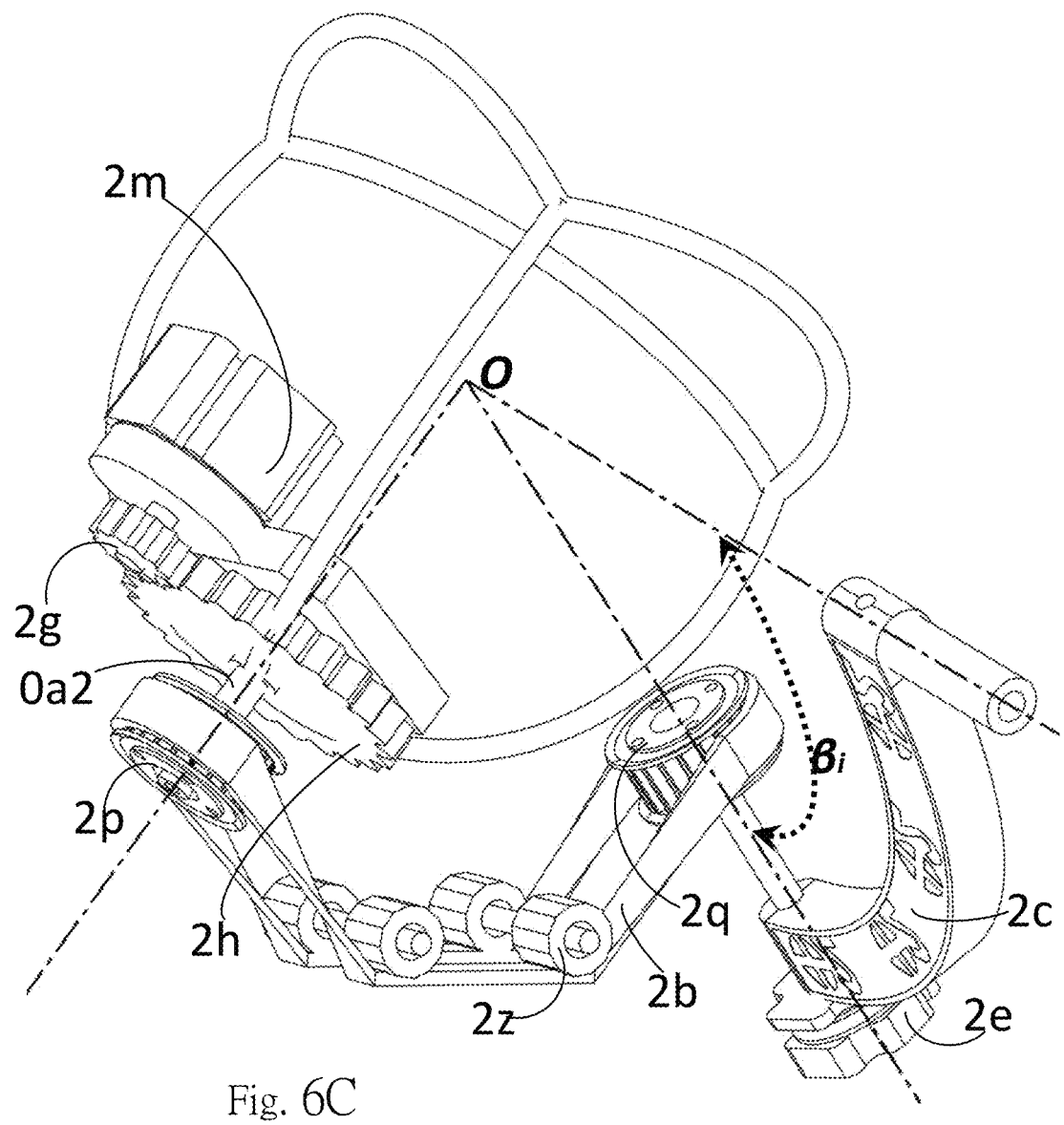
FIG. 6C shows geometrical and perspective drawings of the orbit specification II.

Both ends of the timing belt 2b are separately meshed and rotated with the base timing pulley 2p and the terminal timing pulley 2q. A direction and tension of the timing belt 2b are functionally adjusted by the at least one pair of idler pulleys 2z. The terminal timing pulley 2q is synchronously rotated via the timing belt 2b by the base timing pulley 2p. See FIG. 3C, FIG. 4C, FIG. 4C, and FIG. 6C.

There may be at least one base driver set, wherein each base driver set comprises a base driving module 1m, a base active gear 1g and a base passive gear 1h. The base active gear 1g is fastened onto the output shaft of the base driving module 1m. The base passive gear 1h is pivotally fastened onto the passive end of the outer hollow shaft 0a1 of the base rotating module 0a.

According to a pre-defined gear ratio, the base active gear 1g and the base passive gear 1h are selected to meet a design requirement. The distance between the shaft bores of the base active gear 1g and the base passive gear 1h is equal to a sum of reference radii of the base active gear 1g and the base passive gear 1h. The base passive gear 1h meshed with the base active gear 1g is synchronously rotated by the base driving module 1m. The distance between shaft bores of the base active gear 1g and the base passive gear 1h can be zero. The base driving module 1m is pivotally fastened onto the passive end of the outer hollow shaft 0a1 of the base rotating module 0a. See FIG. 3B and FIG. 4B.

There may be at least one terminal driver set, wherein each terminal driver set comprises a terminal driving module 2m, a terminal active gear 2g, and a terminal passive gear 2h. The terminal active gear 2g is fastened onto the output shaft of the terminal driving module 2m. The terminal passive gear 2h is pivotally fastened onto the passive end of the inner hollow shaft 0a2 of the base rotating module 0a.

Figure 5A:
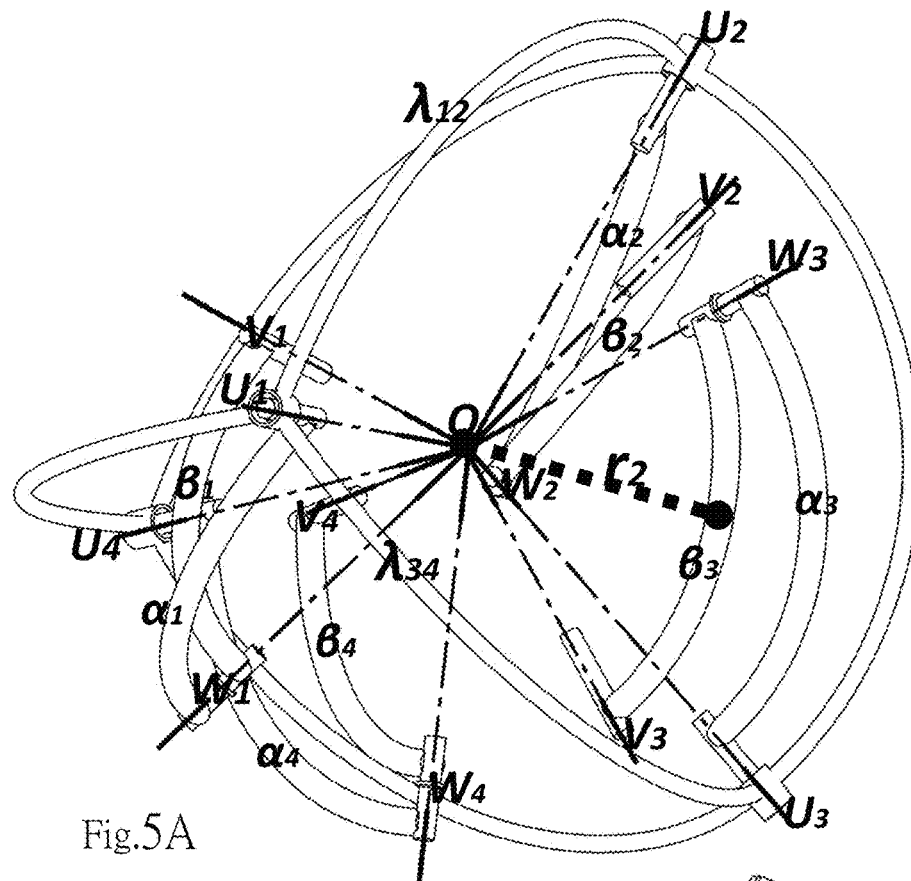
FIG. 5A shows geometrical and perspective drawings of the orbit specification I
Figure 5B:
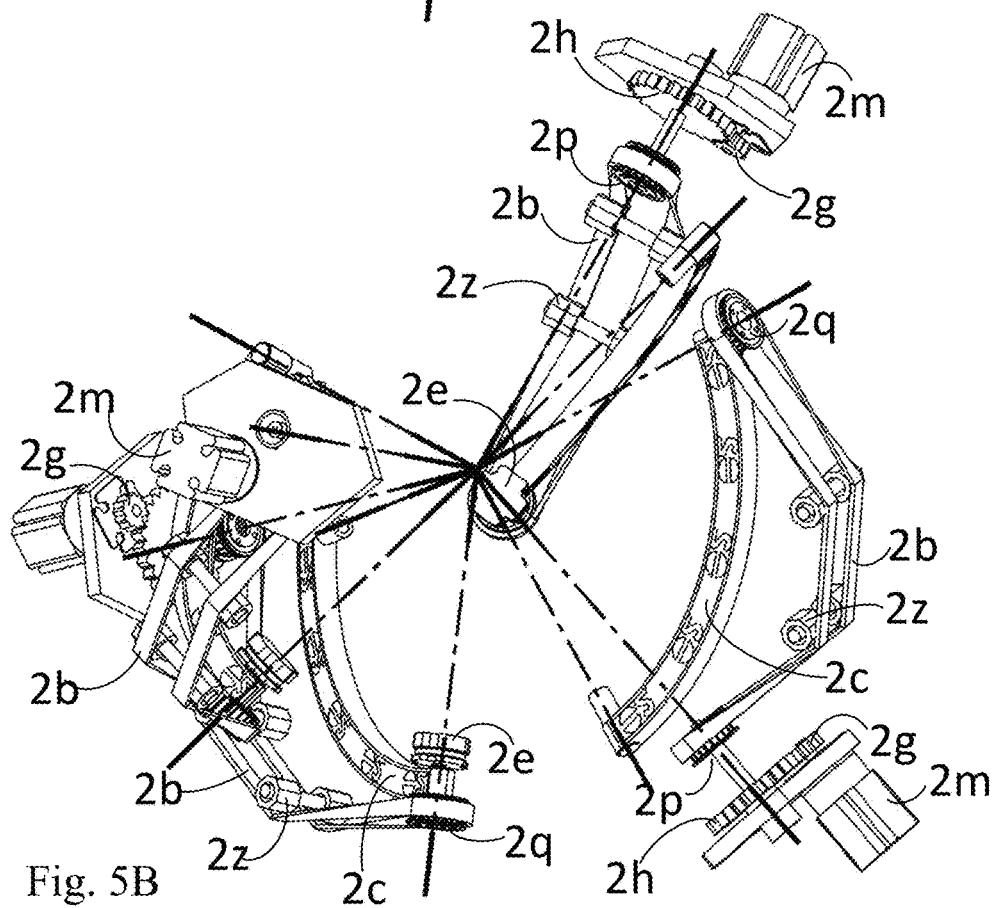
FIG. 5B shows geometrical and perspective drawings of the orbit specification I
Figure 5C:
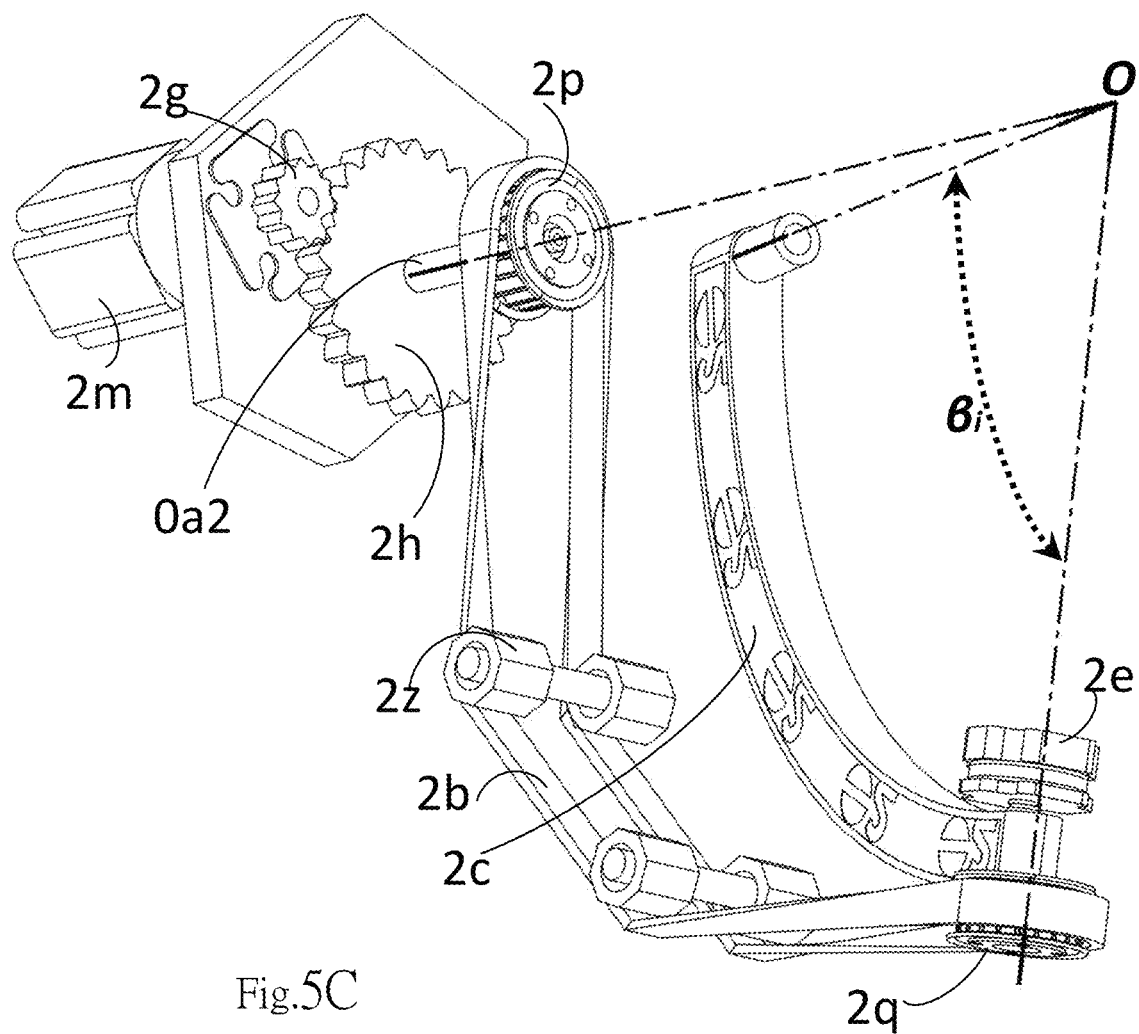
FIG. 5C shows geometrical and perspective drawings of the orbit specification I

According to a pre-defined gear ratio, the terminal active gear 2g and the terminal passive gear 2h are selected to meet a design requirement. The distance between the shaft bores of the terminal active gear 2g and the terminal passive gear 2h is equal to a sum of reference radii of the terminal active gear 2g and the terminal passive gear 2h. The terminal passive gear 2h meshed with the terminal active gear 2g is synchronously rotated by the terminal driving module 2m. The distance between shaft bores of the terminal active gear 2g and the terminal passive gear 2h can be zero. The terminal driving module 2m is pivotally fastened onto the passive end of the inner hollow shaft 0a2 of the base rotating module 0a. See FIG. 5B and FIG. 6B.

In the at most two crank sets, each crank set comprises an arc crank 3c and a crank rotating module 3a. An end of the arc crank 3c is mounted on a rod which is concentrically extended opposite side relative to the base frame 0c, these extending lines of the extended rods are denoted by unit vector $N_i$, wherein i=1-2. The other end of the arc crank 3c is pivoted through an axis of base rotating module 0a and installed into the crank rotating module 3a opposite side relative to the base frame 0c, and the arc crank 3c can be concentrically rotated along a geometric orbit between terminal arc-link 2c and terminal frame 4c. The radius of each arc crank's geometric orbit is denoted by $r_3$. An arc-length of arc crank 3c, geometrically represented by $\delta_i$=ArcCos $(U_i \cdot N_i)$, wherein i=1-2, is defined as an angle between the axis of base rotating module 0a and the extended rod mounted onto the same arc crank 3c. The arc-length of arc crank 3c is less than or equal to 90°, i.e.: $\delta_i \leq 90°$, wherein i=1-2. The geometric definitions of a crank set are shown as FIG. 9A-FIG. 9B and FIG. 10A-FIG. 10B.

The crank rotating module 3a can be functionally actuated for preventing predictable interference caused by terminal arc-link 2c and/or terminal frame 4c. Each crank set further comprises a crank saddle 3s which can be equipped onto the arc crank's extended rod opposite side relative to the base frame 0c for carrying the payload. The crank saddle 3s can be a clamp of a lathe to support a shaft of a laser cutter or install a drill as applied in multi-shaft composite machining centers.

The end effect arc-link assembly introduced in the second patent (U.S. Pat. No. 9,579,786) is renamed as a crank set, and "at least one" end effect arc-link assemblies is renamed as "at most two" crank sets. Due to geometric configurations, no more than four crank sets may be installed in the base frame 0c. After simulating and verifying, utility and effectiveness of greater than two crank sets are worthless, because they are unavoidably interfered with base frame 0c and/or each arc-link set. Working space of two crank sets is also reduced but acceptable, because they can clamp the payload corporately and stably. A working space of one crank set may be gradually increased and a single crank hanging alone may produce oscillation and vibration.

While the first patent (U.S. Pat. No. 8,579,714) has a greater space for orientating due to no hinder of any crank set, it is capable of directly outputting torque due to eliminating crank set. Although there may be a shortage of crank saddles 3s, a payload may still be carried on equipping terminal saddles 4s. The different quantity of crank sets may be separately adapted in different suitable domains, therefore, the quantity about "at most two" is adapted in the invention to replace by the quantity about "at least one" in the second patent (U.S. Pat. No. 9,579,786). After analyzing geometrics and configurations, the sufficient and enable mode is disclosed as expected.

The base frame 0c can be either a close-chain type or an open-chain type, and the close-chain type is configured to enhance rigidity to avoid vibration or deformation. The open-chain type is configured to prevent predictable interference caused by arc-link sets and/or crank sets.

The base rotating module 0a can be assembled by a torque output device and/or an angle sensor and/or a bearing with a shaft. The arc-link rotating module 2a can be assembled by a torque output device and/or an angle sensor and/or a bearing with a shaft. The terminal rotating module 4a can be assembled by a torque output device and/or an angle sensor and/or a bearing with a shaft. The crank rotating module 3a can be assembled by a torque output device and/or an angle sensor and/or a bearing with a shaft.

There are six embodiments.

Figure 11A:
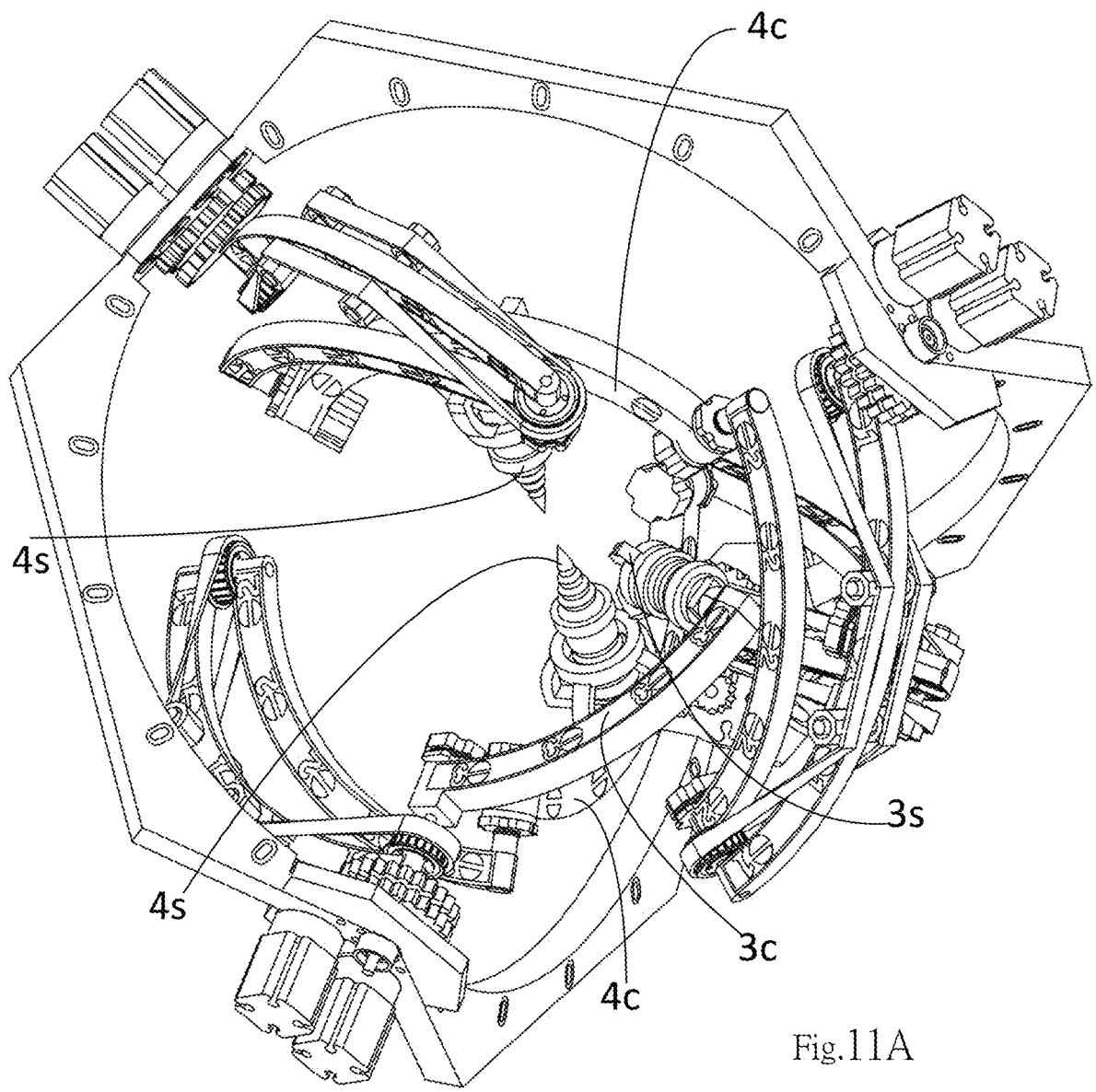
FIG. 11A shows the first embodiment's 3-view drawings for the orbit specification I with a single crank set.
Figure 11B:
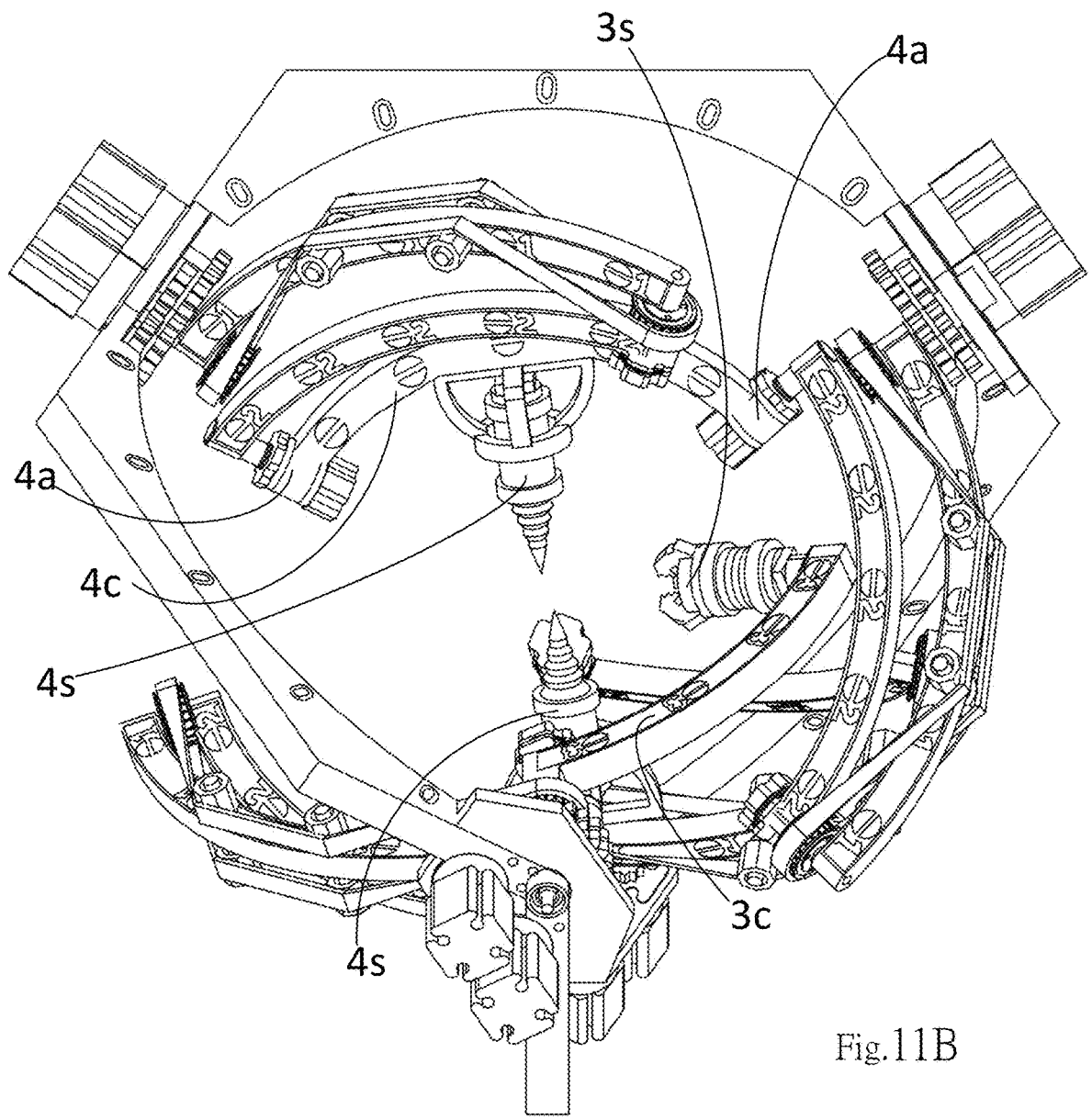
FIG. 11B shows the first embodiment's 3-view drawings for the orbit specification I with a single crank set.
Figure 11C:
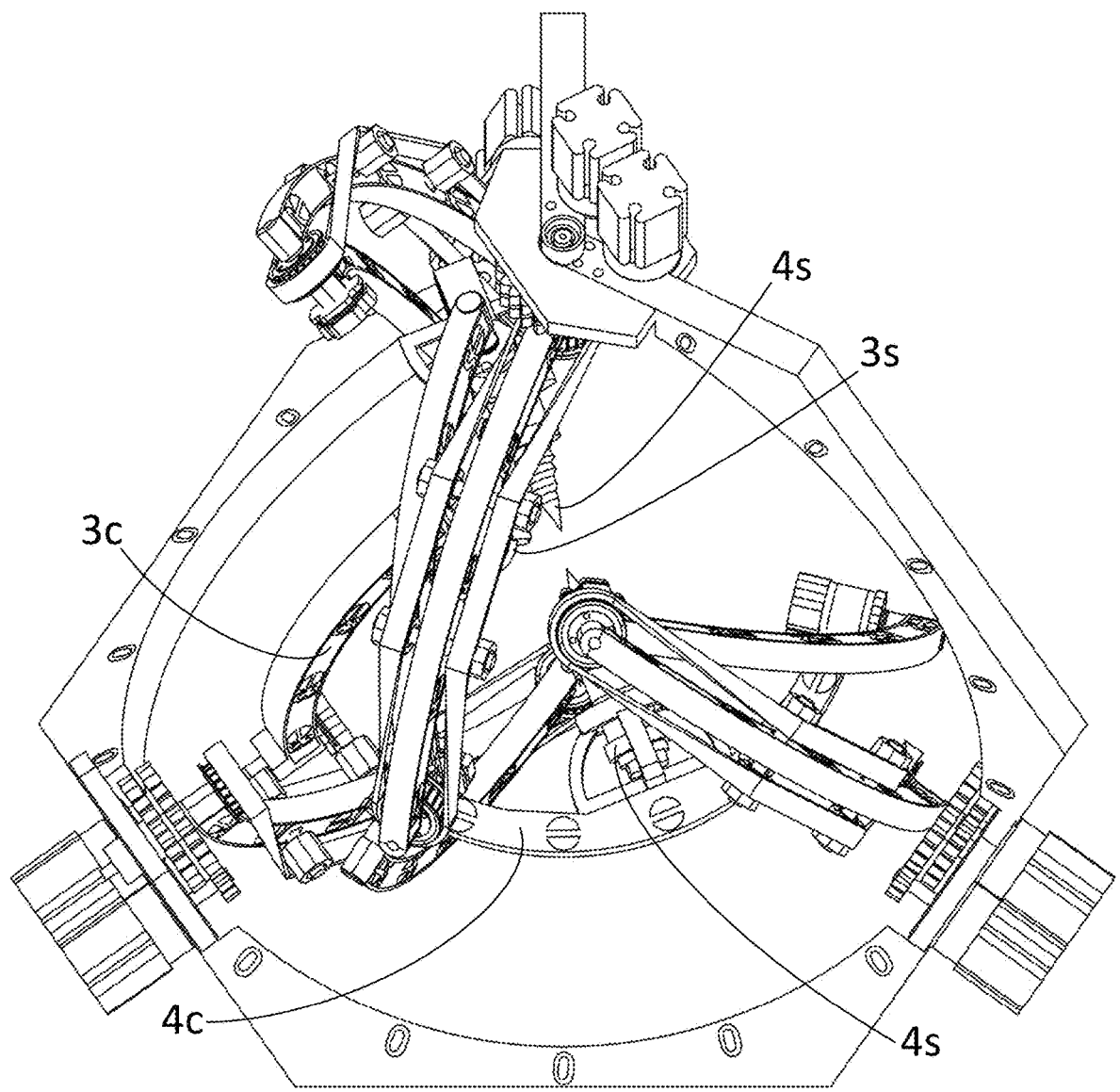
FIG. 11C shows the first embodiment's 3-view drawings for the orbit specification I with a single crank set.

The first embodiment is the orbit specification I with a single crank set, shown as FIG. 11A-FIG. 11C.

Figure 12A:
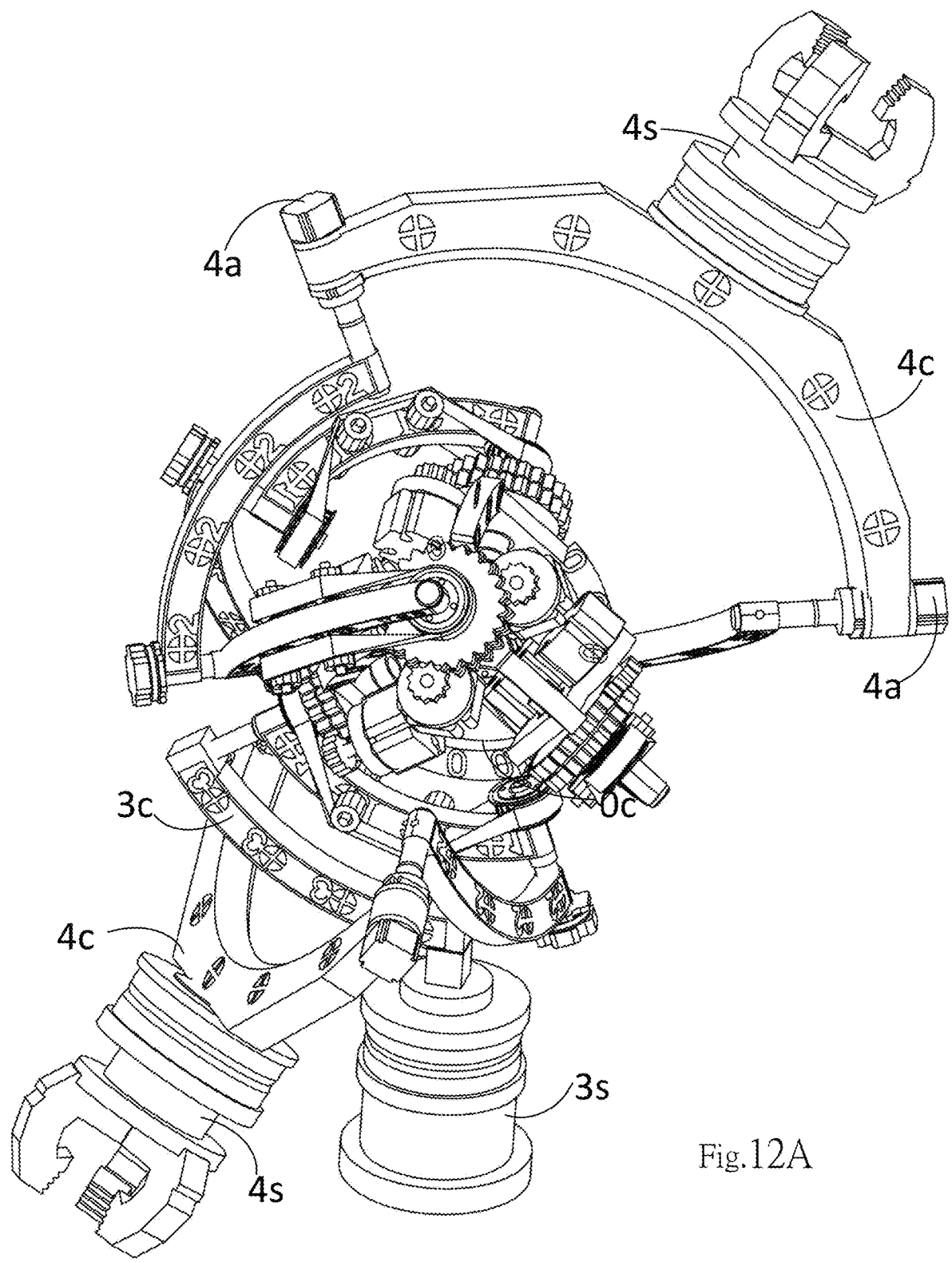
FIG. 12A shows the second embodiment's 3-view drawings for the orbit specification II with a single crank set.
Figure 12B:
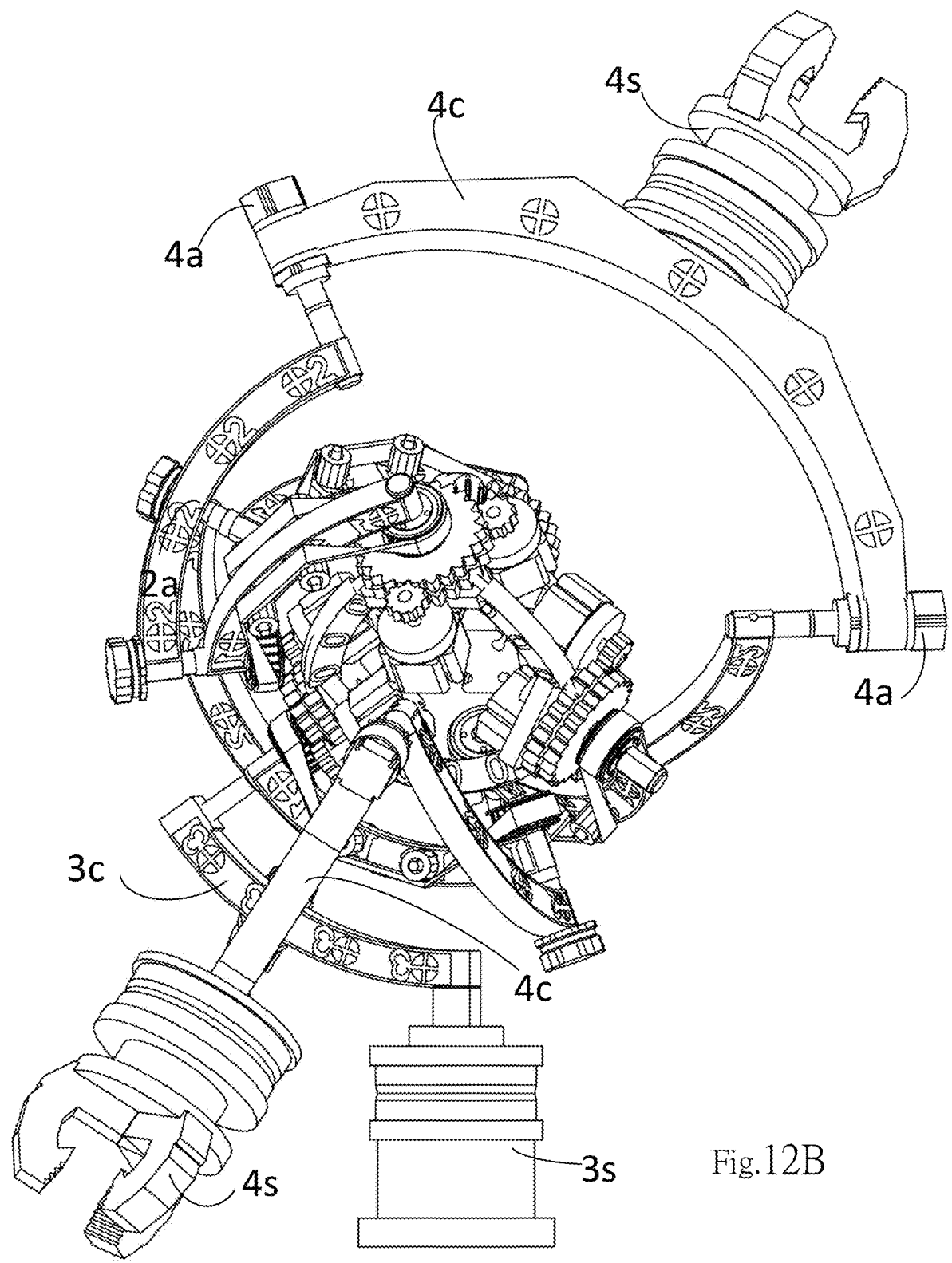
FIG. 12B shows the second embodiment's 3-view drawings for the orbit specification II with a single crank set.
Figure 12C:
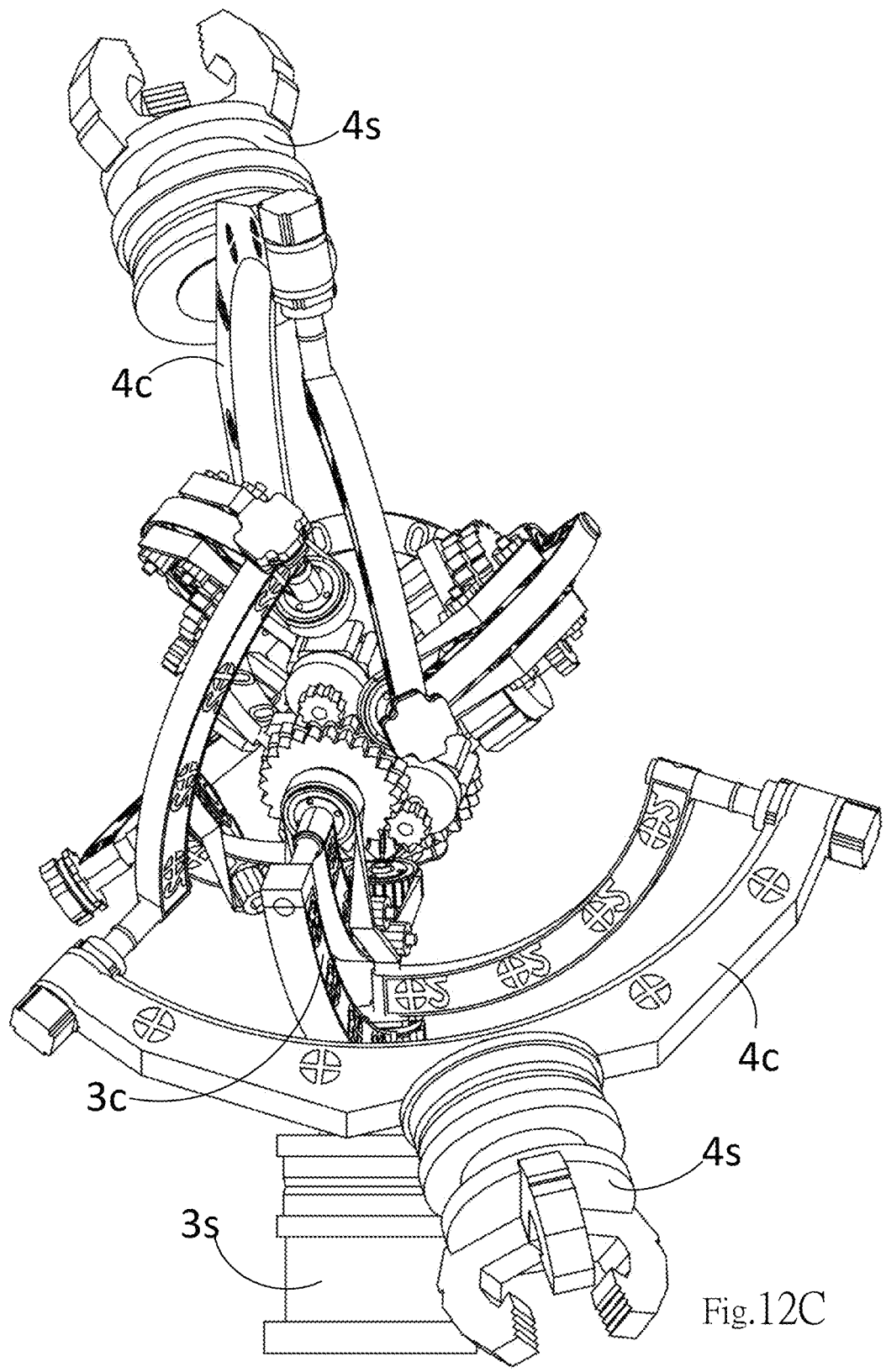
FIG. 12C shows the second embodiment's 3-view drawings for the orbit specification II with a single crank set.

The second embodiment is the orbit specification II with a single crank set, shown as FIG. 12A-FIG. 12C.

Figure 13A:
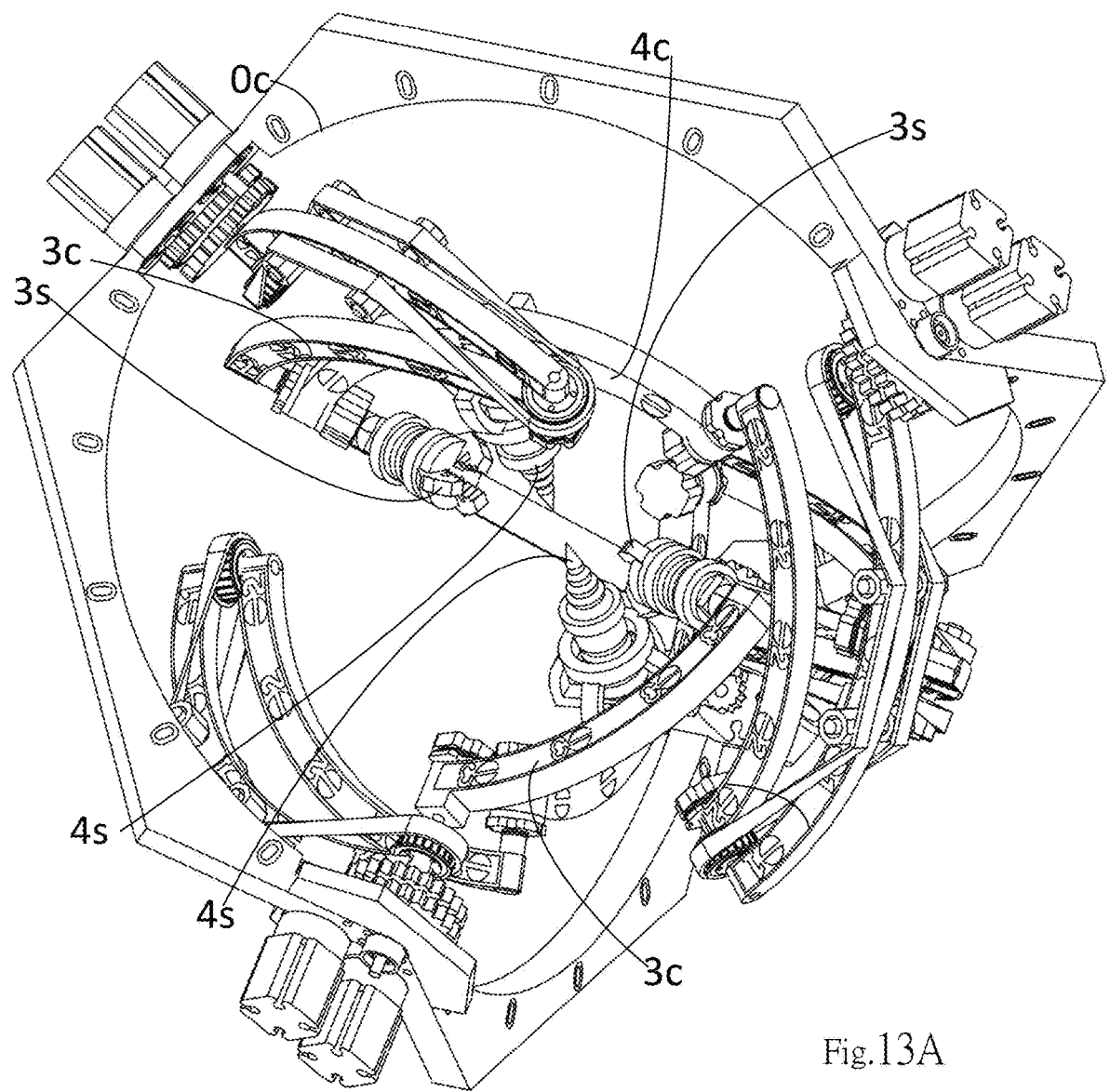
FIG. 13A shows the third embodiment's 3-view drawings for the orbit specification I with double crank sets.
Figure 13C:
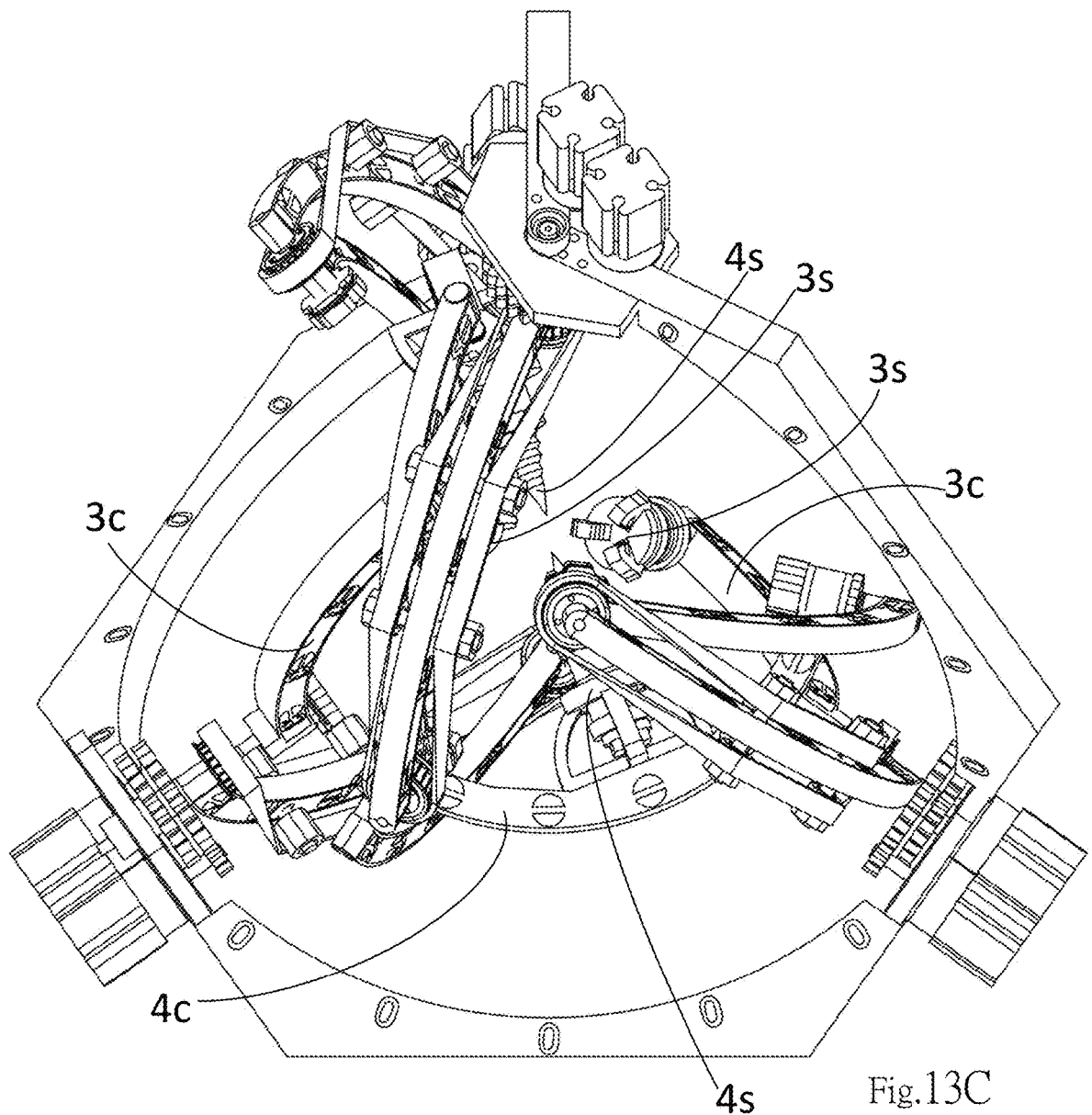
FIG. 13C shows the third embodiment's 3-view drawings for the orbit specification I with double crank sets.

The third embodiment is the orbit specification I with double crank sets, shown as FIG. 13A-FIG. 13C.

Figure 14A:
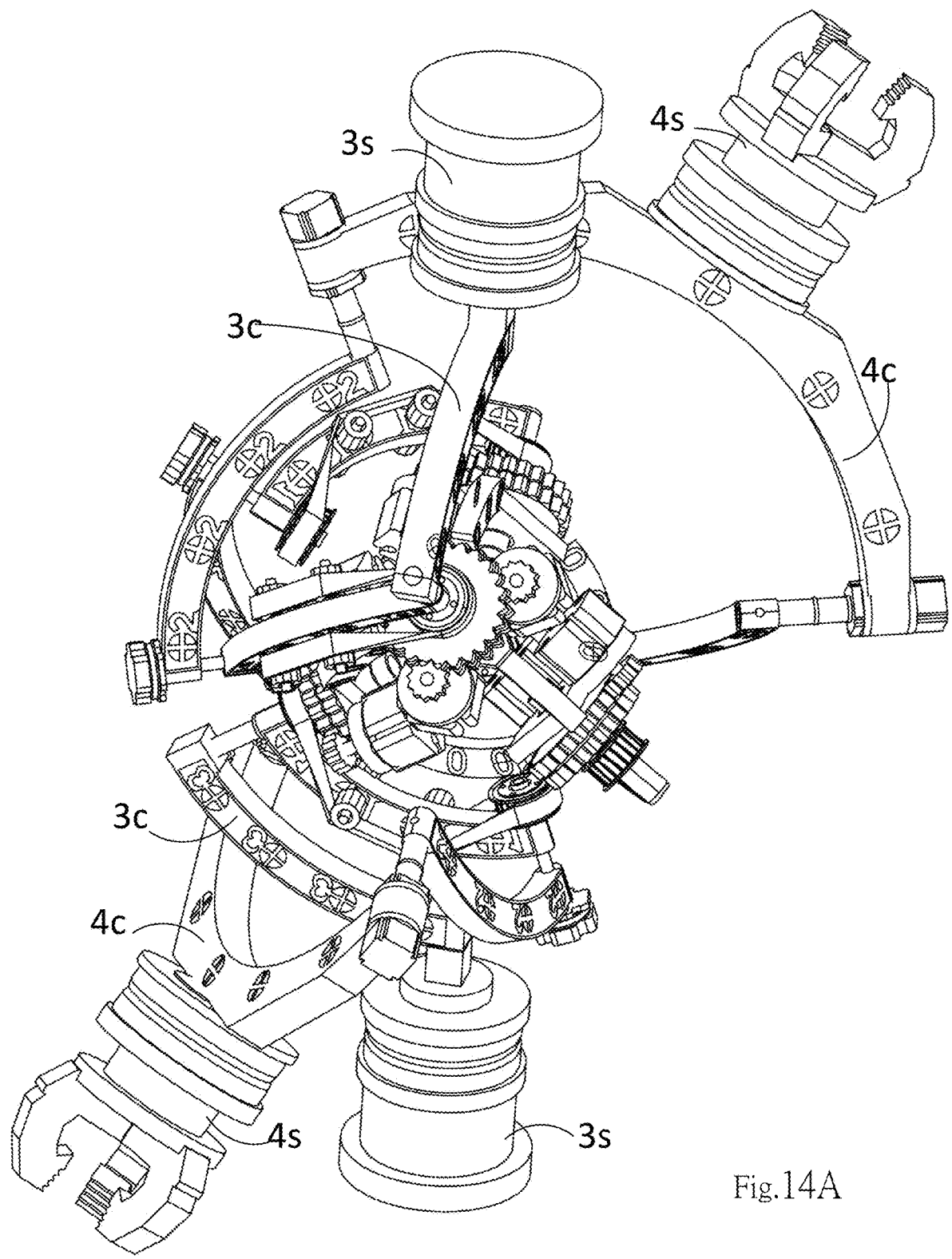
FIG. 14A shows the fourth embodiment's 3-view drawings for the orbit specification II with double crank sets.
Figure 14B:
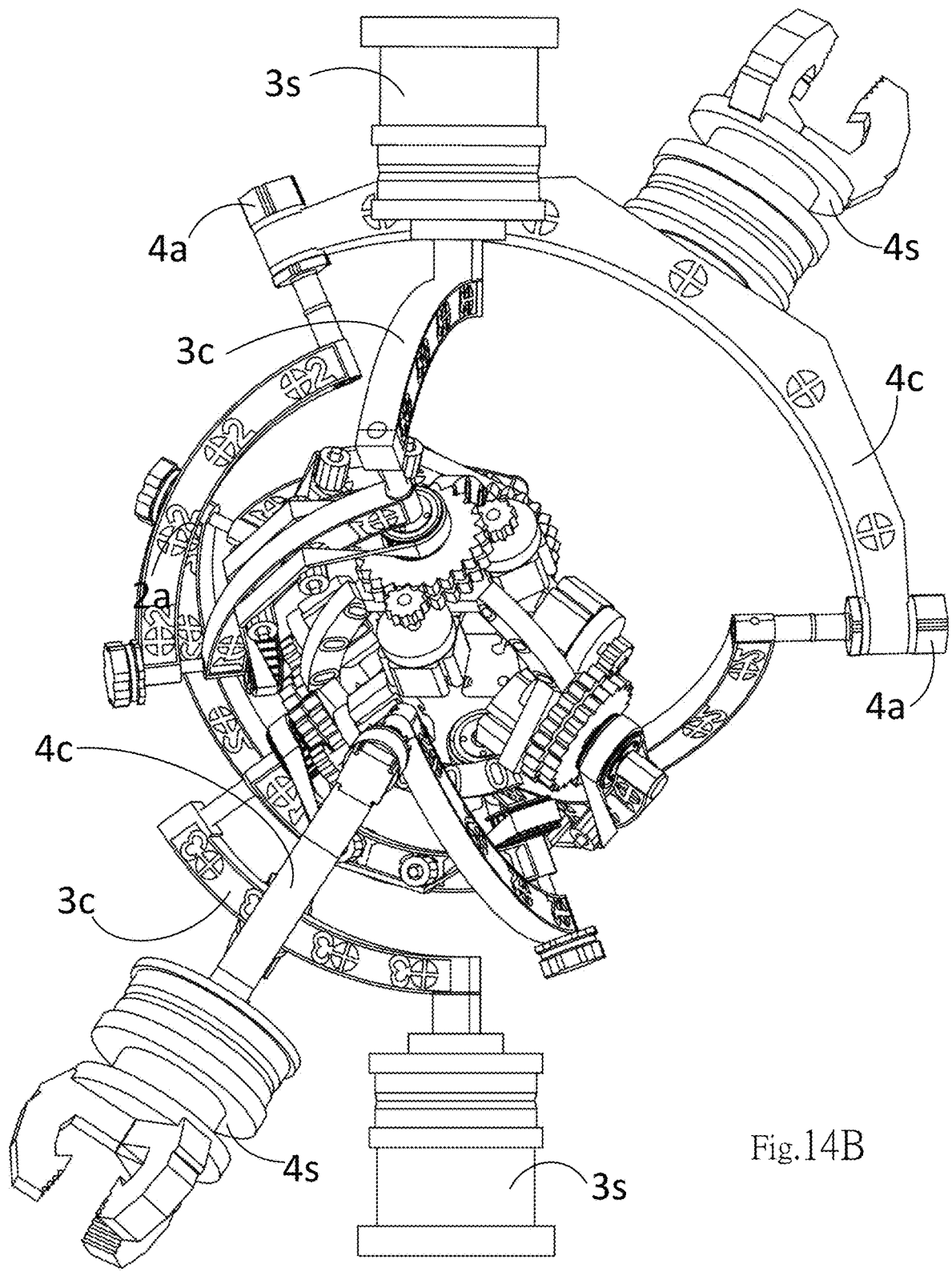
FIG. 14B shows the fourth embodiment's 3-view drawings for the orbit specification II with double crank sets.
Figure 14C:
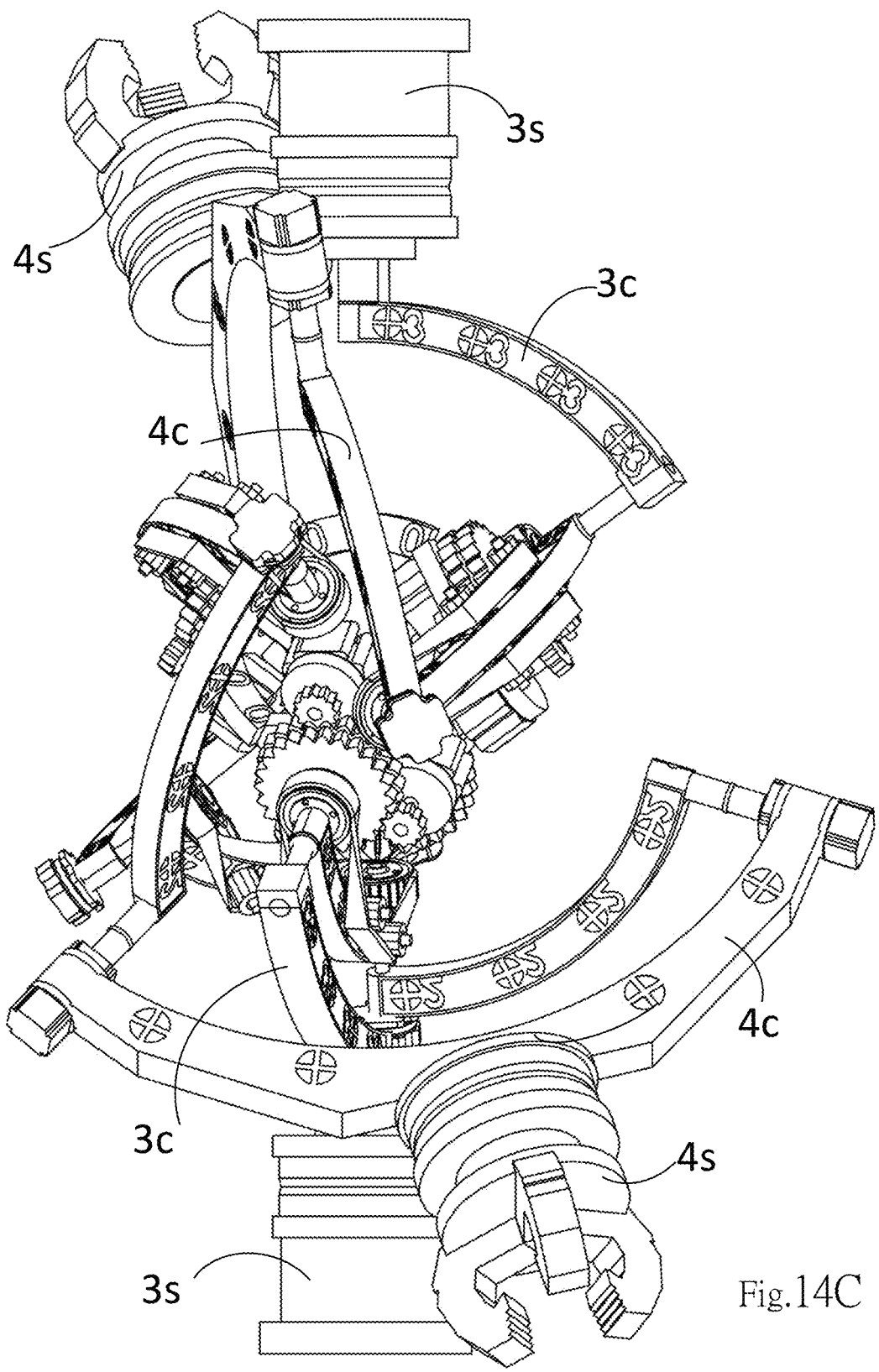
FIG. 14C shows the fourth embodiment's 3-view drawings for the orbit specification II with double crank sets.

The fourth embodiment is the orbit specification II with double crank sets, shown as FIG. 14A-FIG. 14C.

Figure 15A:
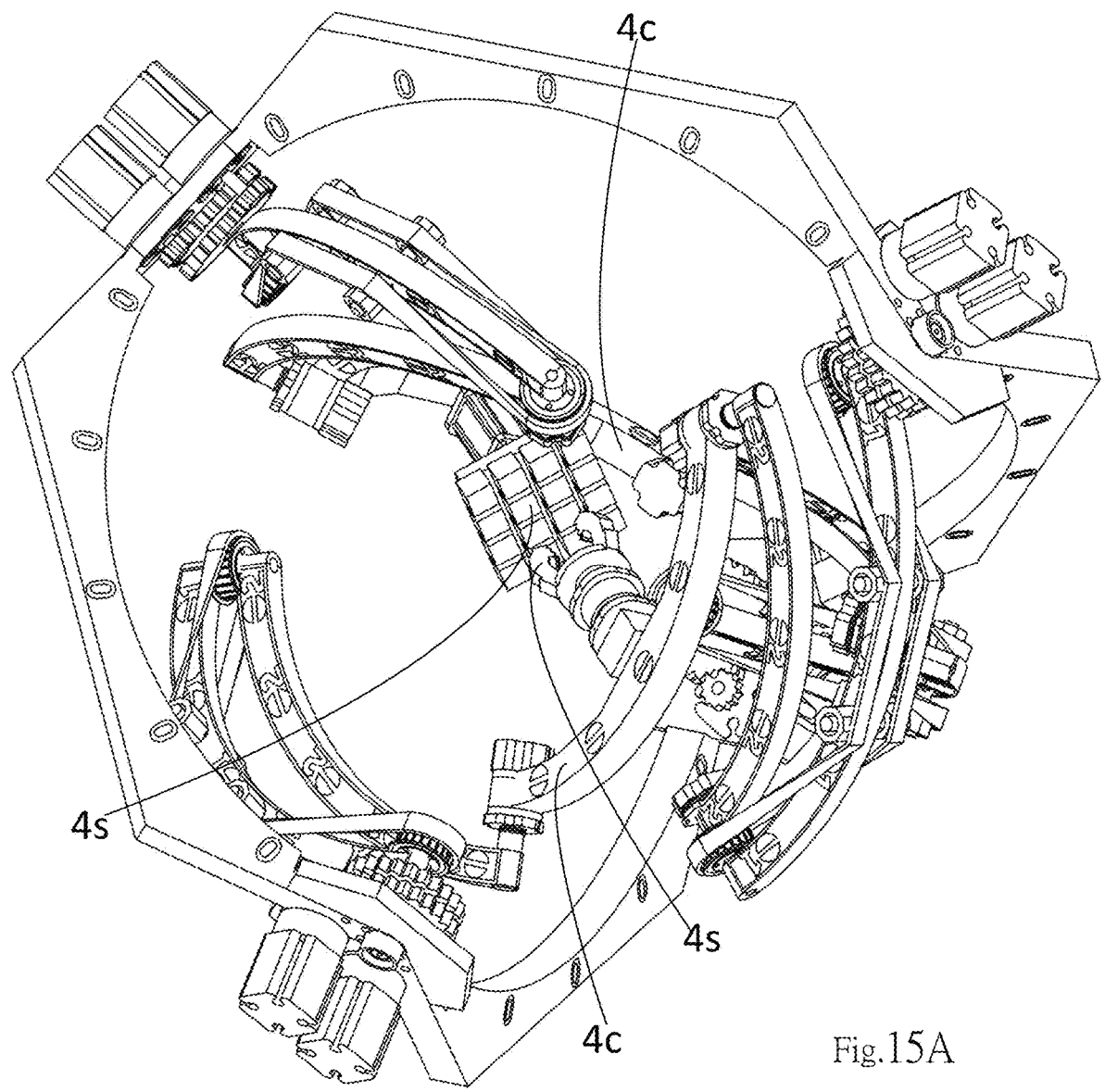
FIG. 15A shows the fifth embodiment's 3-view drawings for the orbit specification I without a crank set.
Figure 15B:
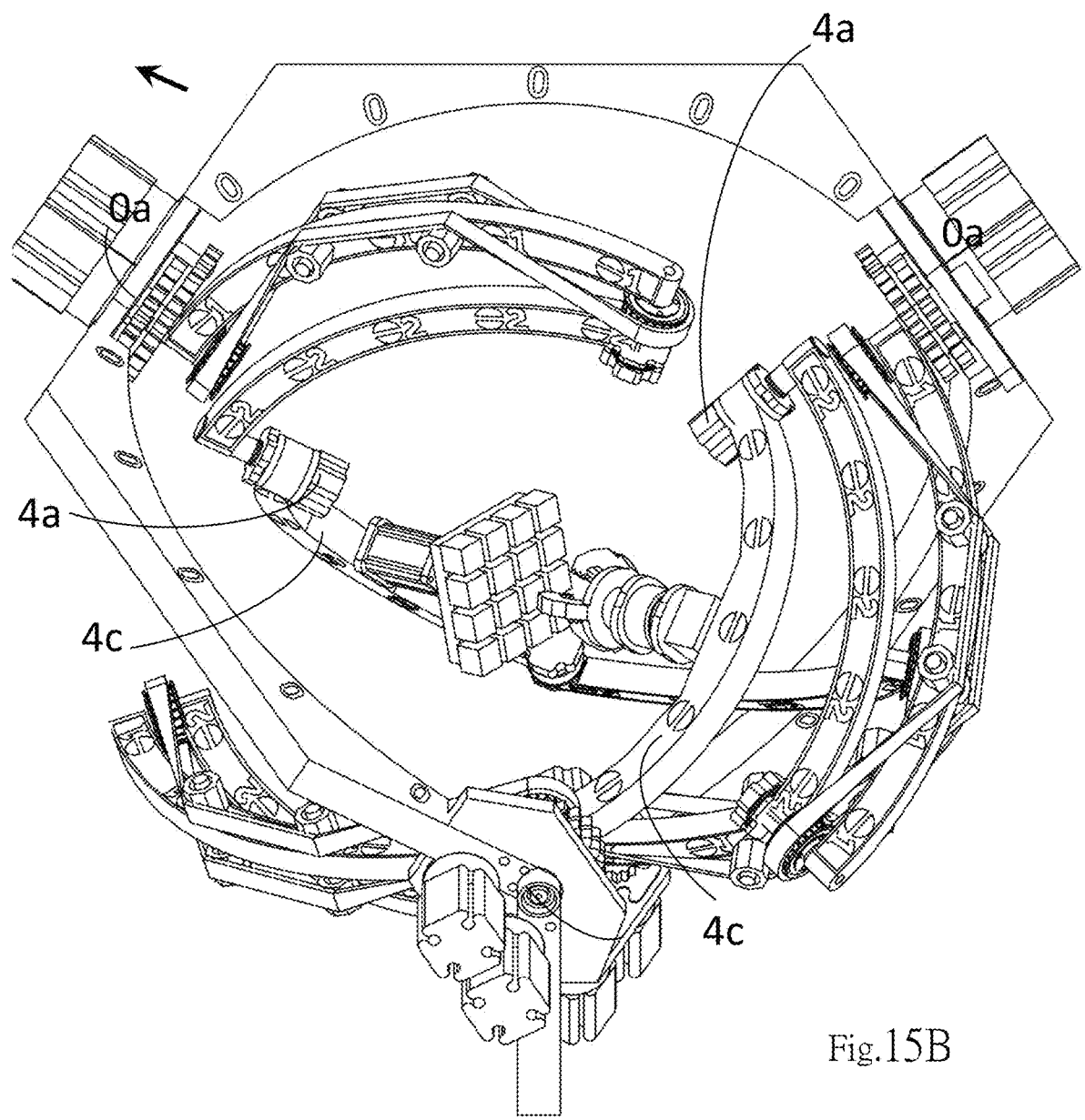
FIG. 15B shows the fifth embodiment's 3-view drawings for the orbit specification I without a crank set.
Figure 15C:
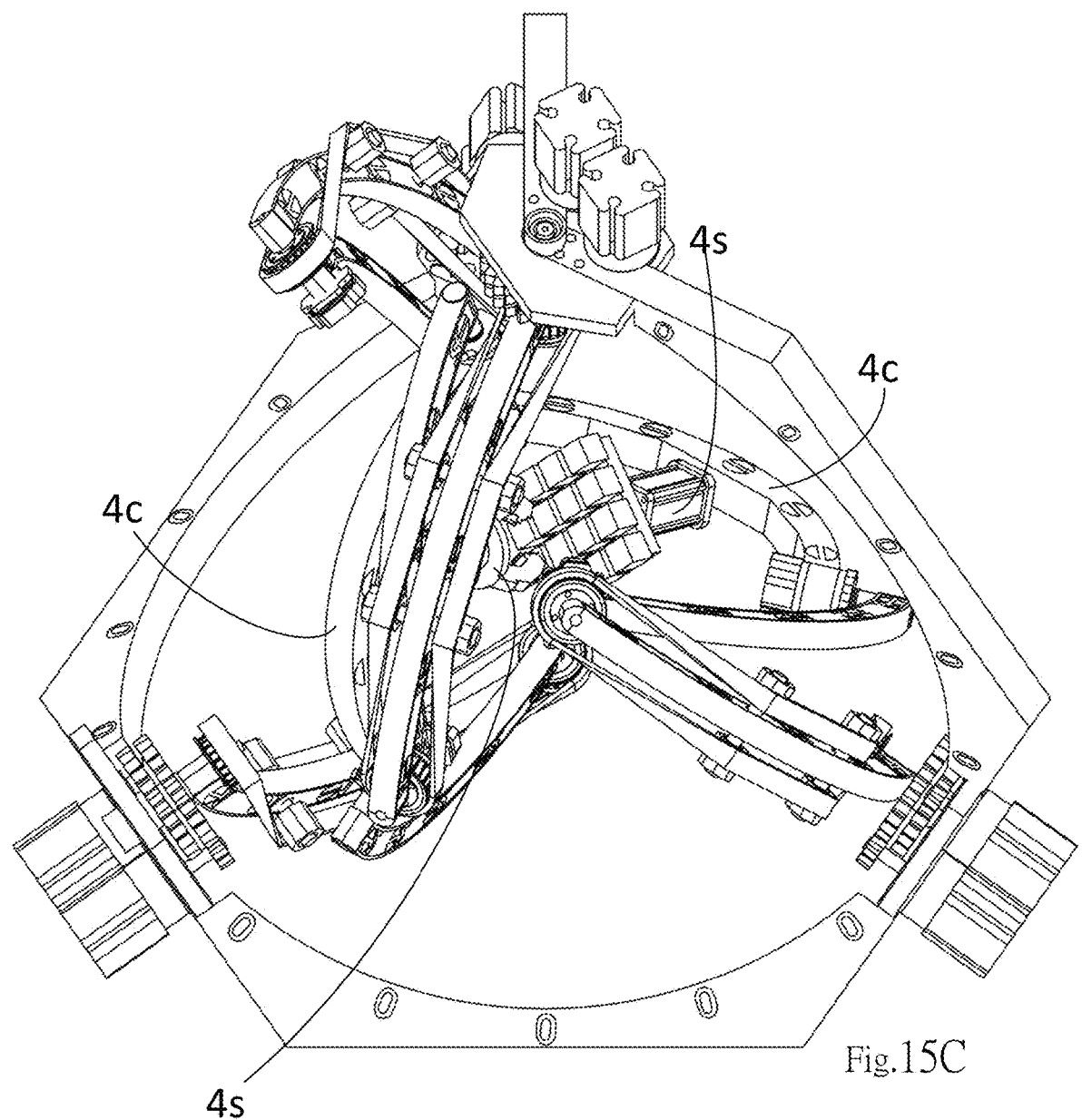
FIG. 15C shows the fifth embodiment's 3-view drawings for the orbit specification I without a crank set.

The fifth embodiment is the orbit specification I without a crank set, shown as FIG. 15A-FIG. 15C.

Figure 16A:
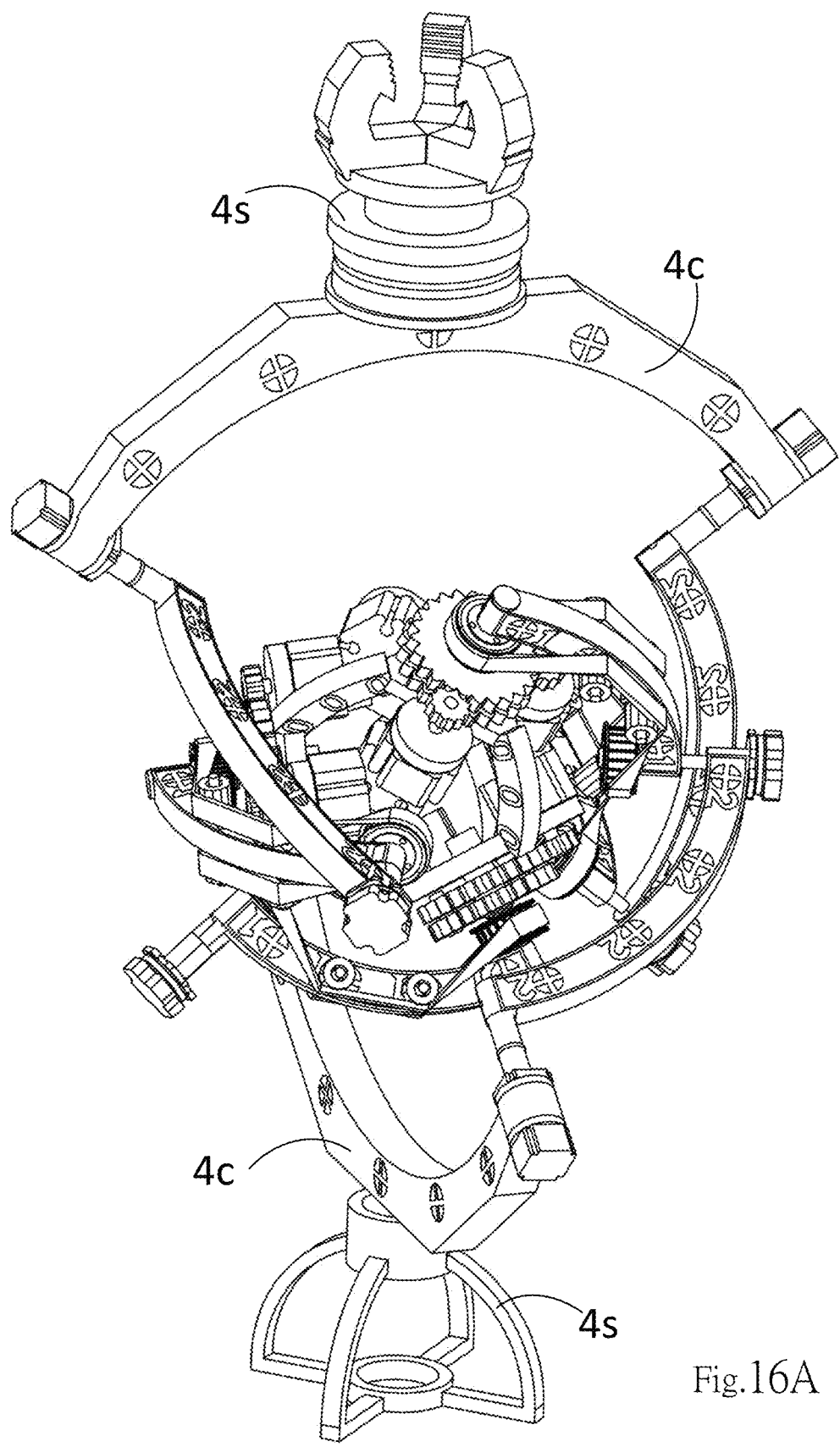
FIG. 16A shows the sixth embodiment's 3-view drawings for the orbit specification II without a crank set.
Figure 16B:
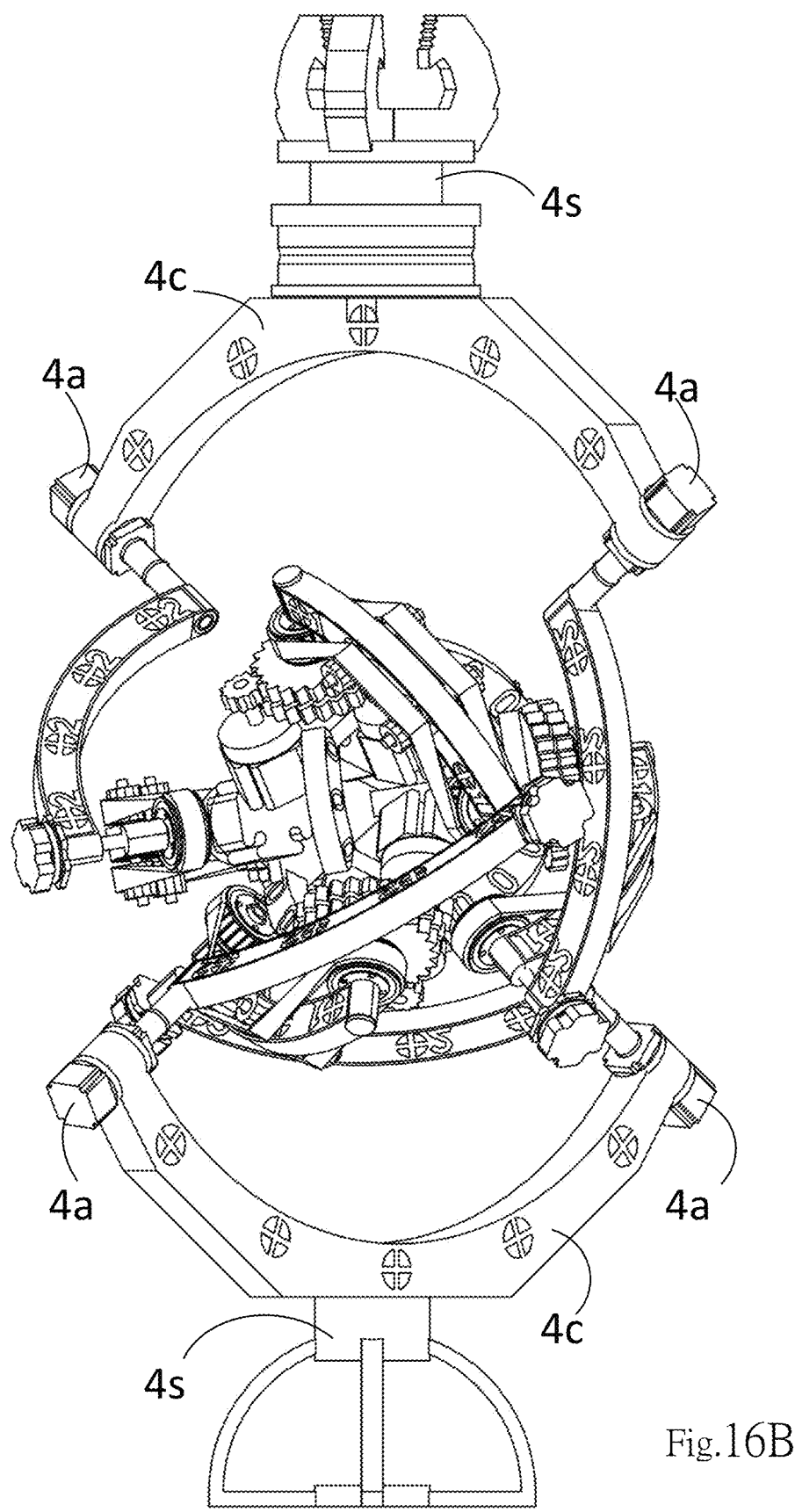
FIG. 16B shows the sixth embodiment's 3-view drawings for the orbit specification II without a crank set.
Figure 16C:
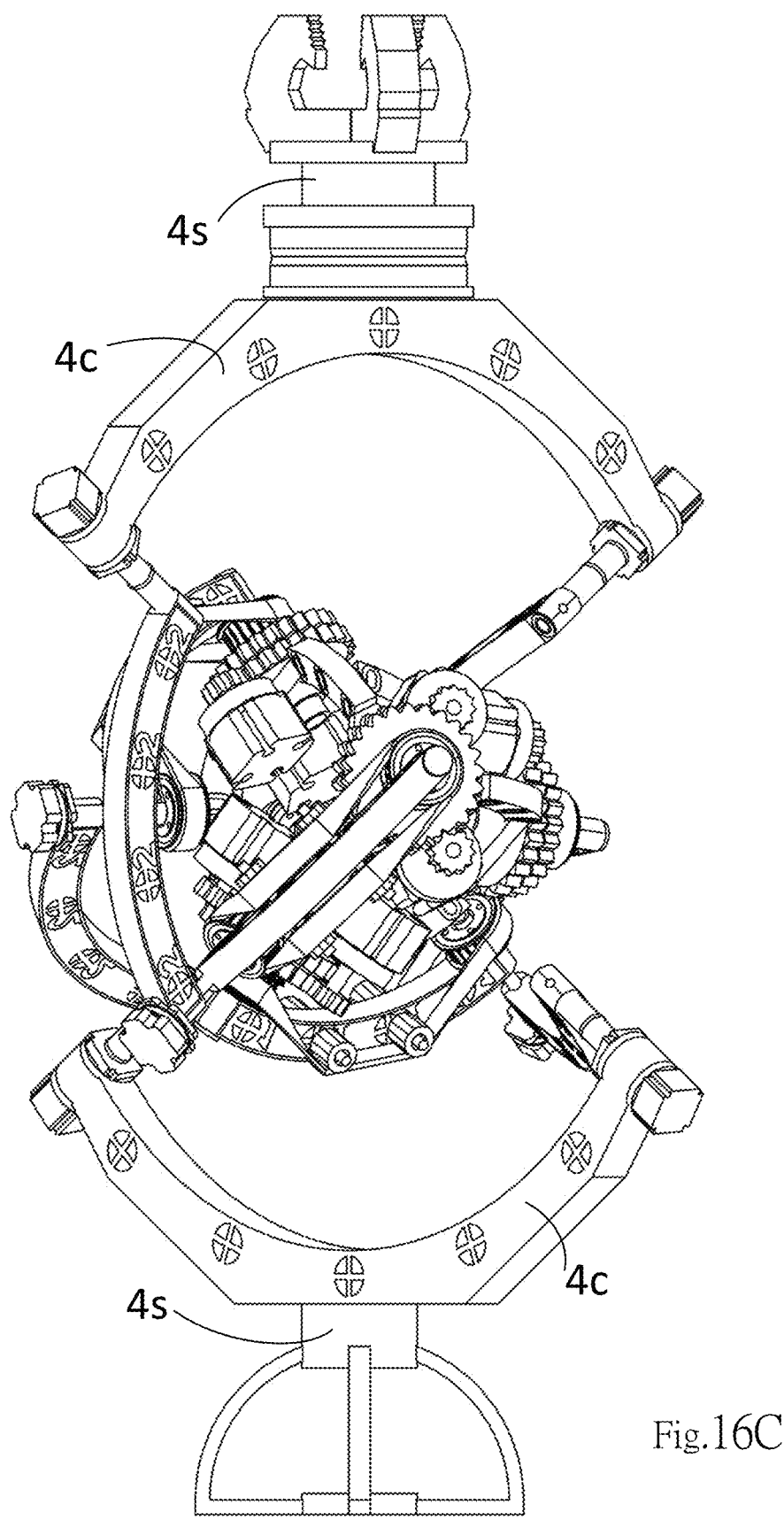
FIG. 16C shows the sixth embodiment's 3-view drawings for the orbit specification II without a crank set.

The sixth embodiment is the orbit specification II without a crank set, shown as FIG. 16A-FIG. 16C.

Those skilled in the art will readily observe that numerous modifications and alterations of the device and method may be made. Accordingly, the above disclosure should be construed as limited only by the metes and bounds of the appended claims.

What is claimed is:

1. A mechanism geometrically constituted with twelve axes configured to be manipulated for spherical coordinate kinematics, comprising:

a base frame set comprising a base frame including a plurality of brackets and four base rotating modules installed into the base frame, the base frame configured with four vertexes which can be used to constitute a base geometrical tetrahedron, each axis of the base rotating module configured to be individually coincide with a vertex-to-center line of the base geometrical tetrahedron, and these four vertex-to-center lines coincide with a center of the base frame, wherein an angle between any two vertex-to-center lines of the base geometrical tetrahedron is greater than 75° and less than 150°, each base rotating module comprises an outer hollow shaft and an inner hollow shaft, the outer hollow shaft having both an active end and a passive end, the inner hollow shaft having both an active end and a passive end, and the outer hollow shaft configured to be pivotally rotated with the inner hollow shaft;

two terminal frame sets, each terminal frame set comprising a terminal frame and two terminal rotating modules installed into the terminal frame, the terminal frame geometrically defined by two vertexes which can be used to constitute a terminal geometrical arc, each axis of terminal rotating module configured to individually coincide with a vertex-to-center line of the terminal geometrical arc, and these two vertex-to-center lines coincide with the center of the base frame for concentrically rotating the terminal frame along a specified geometric orbit, wherein an angle between the two vertex-to-center lines of the terminal geometrical arc is greater than 75° and less than 150°;

four arc-link sets, each arc-link set comprising a base arc-link, a terminal arc-link, an arc-link rotating module, a base timing pulley, a terminal timing pulley, a timing belt and at least one pair of idler pulleys, the base arc-link having both a base end and a terminal end, the terminal arc-link having both a base end and a terminal end, the base end of the base arc-link configured to be pivotally rotated with the base end of the terminal arc-link via the arc-link rotating module, the base end of the base arc-link configured to be pivotally fastened onto the passive end of the inner hollow shaft, the terminal end of the terminal arc-link configured to be pivotally rotated along an axis of the terminal rotating module, each axis of the arc-link rotating modules normally directed into the center of the base frame for concentrically rotating each arc-link set along a specified geometric orbit between the base frame and the terminal frames, wherein sum of arc-lengths of any two of the base arc-links is greater than or equal to an angle between their corresponding vertex-to-center lines of the base geometrical tetrahedron, wherein a sum of arc-lengths of any two of the terminal arc-links is greater than or equal to an angle between their corresponding vertex-to-center lines of the terminal geometrical arc, the base timing pulley configured to be pivotally fastened onto the active end of outer hollow shaft, the terminal timing pulley configured to be pivotally fastened onto the base end of the terminal arc-link, the at least one pair of idler pulleys configured to be installed onto both sides of the base arc-link individually, wherein all flanges of the at least one pair of idler pulleys configured to be unable to exceed the outer flange of the base arc-link, both ends of the timing belt configured to be separately meshed and rotated with the base timing pulley and the terminal timing pulley, wherein direction and tension of the timing belt configured to be functionally adjusted by the at least one pair of idler pulleys, wherein the terminal timing pulley configured to be synchronously rotated via the timing belt by the base timing pulley;

at least one base driver sets, each base driver set comprising a base driving module, a base active gear and a base passive gear, the base active gear configured to be fastened onto the output shaft of the base driving module 1m, the base passive gear configured to be pivotally fastened onto the passive end of the outer hollow shaft, a distance between the shaft bores of the base active gear and the base passive gear equal to a sum of reference radii of the base active gear and the base passive gear, wherein the base passive gear meshed with the base active gear are configured to be synchronously rotated by the base driving module;

at least one terminal driver sets, each terminal driver set comprising a terminal driving module, a terminal active gear and a terminal passive gear, the terminal active gear configured to be fastened onto the output shaft of the terminal driving module, the terminal passive gear configured to be pivotally fastened onto the passive end of the inner hollow shaft, a distance between the shaft bores of the terminal active gear and the terminal passive gear is equal to a sum of reference radii of the terminal active gear and the terminal passive gear, wherein the terminal passive gear meshed with the terminal active gear are configured to be synchronously rotated by the terminal driving module; and at most two crank sets, each crank set comprising an arc crank and an crank rotating module, an end of the arc crank configured to be mounted a rod which is concentrically extended opposite side relative to the base frame, the other end of the arc crank configured to be pivoted through an axis of the base rotating module and installed into the crank rotating module opposite side relative to the base frame, and the arc crank configured to be concentrically rotated along a geometric orbit between terminal arc-link and terminal frame; wherein the arc-length of the arc crank is less than or equal to 90°.

2. The mechanism according to claim 1, wherein each base driver set further comprises:
a base active gear; and
a base passive gear, wherein a distance between shaft bores of the base active gear and the base passive gear is substantially zero and the base driving module is configured to be pivotally fastened onto the passive end of the outer hollow shaft.

3. The mechanism according to claim 1, wherein each terminal driver set further comprises:
a terminal active gear; and
a terminal passive gear, wherein a distance between shaft bores of the terminal active gear and the terminal passive gear is substantially zero and the terminal driving module is configured to be pivotally fastened onto the passive end of the inner hollow shaft.

4. The mechanism according to claim 1, wherein each terminal frame set further comprises:
a terminal saddle configured to be equipped onto the terminal frame's opposite side relative to terminal arc-links for carrying a payload.

5. The mechanism according to claim 1, wherein each crank set further comprises:
a crank saddle configured to be equipped onto the arc crank's extended rod opposite side relative to the base frame for carrying a payload.

6. The mechanism according to claim 1, wherein the base rotating module is configured to be assembled by at least one of a torque output device, an angle sensor, and a bearing with an shaft, the arc-link rotating module is configured to be assembled by at least one of the torque output device, the angle sensor, and the bearing with the shaft, the terminal rotating module is configured to be assembled by at least one of the torque output device, the angle sensor, and the bearing with the shaft, and the crank rotating module is configured to be assembled by at least one of the torque output device, the angle sensor, and the bearing with the shaft.

7. The mechanism according to claim 1, wherein the base frame is either a close-chain type which is configured to enhance rigidity for preventing at least one of vibration deformation, or an open-chain type which is configured to prevent predictable interference caused by at least one of arc-link sets and crank sets.

8. A mechanism geometrically constituted with twelve axes configured to be manipulated for spherical coordinate kinematics, comprising:

a base frame set comprising a base frame including a plurality of brackets and four base rotating modules installed into the base frame, the base frame configured with four vertexes which can be used to constitute a base geometrical tetrahedron, each axis of the base rotating module configured to be individually coincide with a vertex-to-center line of the base geometrical tetrahedron, and these four vertex-to-center lines coincide with the center of the base frame, wherein the angle between any two vertex-to-center lines of the base geometrical tetrahedron is greater than 75° and less than 150°, each base rotating module comprising an outer hollow shaft and an inner hollow shaft, the outer hollow shaft having both an active end and a passive end, the inner hollow shaft having both an active end and a passive end, wherein the outer hollow shaft is configured to be pivotally rotated with the inner hollow shaft;

two terminal frame sets, each terminal frame set comprising a terminal frame and two terminal rotating modules installed into the terminal frame, the terminal frame configured to be geometrically defined by two vertexes which constitute a terminal geometrical arc, each axis of terminal rotating module configured to individually coincide with a vertex-to-center line of the terminal geometrical arc, and these two vertex-to-center lines configured to be coincide with the center of the base frame for concentrically rotating the terminal frame along a specified geometric orbit, wherein an angle between the two vertex-to-center lines of the terminal geometrical arc is greater than 75° and less than 150°;

four arc-link sets, each arc-link set comprising a base arc-link, a terminal arc-link, an arc-link rotating module, a base timing pulley, a terminal timing pulley, a timing belt and at least one pair of idler pulleys, the base arc-link having both a base end and a terminal end, the terminal arc-link having both a base end and a terminal end, the base end of the base arc-link is configured to be pivotally rotated with the base end of the terminal arc-link via the arc-link rotating module, the base end of the base arc-link is configured to be pivotally fastened onto the passive end of the inner hollow shaft, the terminal end of the terminal arc-link is configured to be pivotally rotated along an axis of the terminal rotating module, each axis of the arc-link rotating modules configured to be is normally directed into the center of the base frame for concentrically rotating each arc-link set along a specified geometric orbit between the base frame and the terminal frames, wherein sum of arc-lengths of any two of the base arc-links is greater than or equal to an angle between their corresponding vertex-to-center lines of the base geometrical tetrahedron; wherein sum of arc-lengths of any two of the terminal arc-links is greater than or equal to an angle between their corresponding vertex-to-center lines of the terminal geometrical arc, the base timing pulley is configured to be pivotally fastened onto the active end of outer hollow shaft, the terminal timing pulley is configured to be pivotally fastened onto the base end of the terminal arc-link, the at least one pair of idler pulleys is configured to be installed onto both sides of the base arc-link individually, wherein all flanges of the at least one pair of idler pulleys are configured to be unable to exceed the outer flange of the base arc-link, both ends of the timing belt are configured to be separately meshed and rotated with the base timing pulley and the terminal timing pulley, wherein direction and tension of the timing belt are configured to be functionally adjusted by the at least one pair of idler pulleys, wherein the terminal timing pulley is configured to be synchronously rotated via the timing belt by the base timing pulley;

at least one base driver sets, each base driver set comprising a base driving module, a base active gear and a base passive gear, the base active gear is configured to be fastened onto the output shaft of the base driving module $1m$, the base passive gear is configured to be pivotally fastened onto the passive end of the outer hollow shaft, a distance between the shaft bores of the base active gear and the base passive gear equal to sum of reference radii of the base active gear and the base passive gear, wherein the base passive gear meshed with the base active gear are configured to be synchronously rotated by the base driving module; and at least one terminal driver sets, each terminal driver set comprising a terminal driving module, a terminal active gear and a terminal passive gear, the terminal active gear is configured to be fastened onto the output shaft of the terminal driving module, the terminal passive gear is configured to be pivotally fastened onto the passive end of the inner hollow shaft, a distance between the shaft bores of the terminal active gear and the terminal passive gear is equal to a sum of reference radii of the terminal active gear and the terminal passive gear, wherein the terminal passive gear meshed with the terminal active gear is configured to be synchronously rotated by the terminal driving module.

9. The mechanism according to claim 8, wherein each base driver set further comprises:
a base active gear; and
a base passive gear, wherein a distance between shaft bores of the base active gear and the base passive gear is substantially zero and the base driving module is configured to be pivotally fastened onto the passive end of the outer hollow shaft.

10. The mechanism according to claim 8, wherein each terminal driver set further comprises:
a terminal active gear; and
a terminal passive gear, wherein a distance between shaft bores of the terminal active gear and the terminal passive gear is substantially zero and the terminal driving module is configured to be pivotally fastened onto the passive end of the inner hollow shaft.

11. The mechanism according to claim 8, wherein each terminal frame set further comprises:
a terminal saddle configured to be equipped onto the terminal frame's opposite side relative to terminal arc-links for carrying a payload.

12. The mechanism according to claim 8, wherein the base rotating module is configured to be assembled by at least one of a torque output device, an angle sensor, and a bearing with an shaft, the arc-link rotating module is configured to be assembled by at least one of the torque output device, the angle sensor, and the bearing with the shaft, and the terminal rotating module is configured to be assembled by the torque output device, the angle sensor, and the bearing with the shaft.

13. The mechanism according to claim 8, wherein the base frame is either a close-chain type which is configured to enhance rigidity for preventing at least one of vibration and deformation, or an open-chain type which is configured to prevent predictable interference caused by at least one of arc-link sets and crank sets.

* * * * *